US012757157B2

(12) United States Patent
Chrabieh et al.

(10) Patent No.: US 12,757,157 B2
(45) Date of Patent: Oct. 6, 2026

(54) CELLULAR TOWER AND BASE STATION LOCALIZATION

(71) Applicant: NextNav France, Puteaux (FR)

(72) Inventors: Rabih Chrabieh, Montrouge (FR); Minh Hoang, Fontenay-aux-Roses (FR); Mazen Neifer, Evry-Courcouronnes (FR); Vinh Hoang Son Le, Massy (FR); Laurent Sibony, Saint-Germain-en-Laye (FR); Ganda Ouedraogo, Montévrain (FR)

(73) Assignee: NextNav France, Puteaux (FR)

( * ) Notice: Subject to any disclaimer, the term of this patent is extended or adjusted under 35 U.S.C. 154(b) by 314 days.

(21) Appl. No.: 18/666,397

(22) Filed: May 16, 2024

(65) Prior Publication Data

US 2024/0389065 A1 Nov. 21, 2024

Related U.S. Application Data

(60) Provisional application No. 63/503,071, filed on May 18, 2023.

(51) Int. Cl.

| | |
|---|---|
| ***H04W 16/00*** | (2009.01) |
| ***G01S 5/02*** | (2010.01) |
| ***H04W 24/02*** | (2009.01) |
| ***H04W 64/00*** | (2009.01) |
| ***H04W 72/12*** | (2023.01) |

(52) U.S. Cl.

CPC ........... *H04W 64/003* (2013.01); *G01S 5/021* (2013.01); *H04W 24/02* (2013.01); *G01S 2205/008* (2013.01)

(58) Field of Classification Search

CPC ..... H04W 64/003; H04W 24/02; G01S 5/021; G01S 2205/008

See application file for complete search history.

(56) References Cited

U.S. PATENT DOCUMENTS

| | | | | |
|---|---|---|---|---|
| 2011/0244884 A1* | 10/2011 | Kangas | ..................... | G01S 5/12 455/456.1 |
| 2021/0185535 A1* | 6/2021 | Agarwal | ............. | H04W 12/104 |

OTHER PUBLICATIONS

IP.com search History (Year: 2026).*

* cited by examiner

*Primary Examiner* — Moustapha Diaby

(74) *Attorney, Agent, or Firm* — MLO, a professional corp.

(57) ABSTRACT

A method involves determining estimated positions for multiple cells within a region using cellular signals received by a receiver at multiple known receiver positions. Multiple first cell groups are determined using the multiple cells. Respective estimated positions are determined for each cell group of the first cell groups. Each cell group of the first cell groups is validated using the respective estimated position of each cell group and the known receiver positions. Multiple second cell groups are generated based on the cell group validation. An estimated position of each cell group of the second cell groups is used as an estimated position of a respective base station within the region, and a base station almanac is updated using a respective estimated position for each of the base stations.

20 Claims, 10 Drawing Sheets

100

CELLULAR TOWER AND BASE STATION LOCALIZATION

RELATED APPLICATIONS

This application claims priority to U.S. Provisional Patent Application No. 63/503,071, filed May 18, 2023, all of which is incorporated herein by reference in its entirety.

BACKGROUND

The creation and usage of cellular tower and base station almanacs is an important part of cellular network technology. A base transceiver station (BTS) almanac, or "base station almanac", is a data file that contains information about the location, status, and other characteristics of cellular towers and base stations in a given area. This information is used by network operators for network operation and maintenance.

The creation of a base station almanac for precise localization purposes, generated by a network operator or third-party, conventionally involves the manual deployment of specialized equipment, such as high-precision GNSS receivers and radio frequency (RF) receivers, to gather data on the location, signal strength, and other characteristics of nearby towers and base stations. This data is then processed and compiled into a comprehensive base station almanac file that can be loaded onto mobile devices or other network components.

The base station almanac file is frequently updated to reflect changes in the cellular network, such as the addition or removal of towers and base stations, changes in signal strength or quality, and other factors. Mobile devices use the base station almanac to determine which towers and base stations are in range, and to select the best available network connection based on signal strength, quality, and other factors.

One example use of the base station almanac involves determining an accurate location of a mobile device (e.g., a phone, laptop computer, tablet, or another device) in an environment using cell tower multilateration. Multilateration involves solving a set of mathematical equations derived from the distances between the mobile device and each of the known transmit points. These distances are typically calculated based on the time of arrival (TOA), time difference of arrival (TDOA), or received signal strength (RSS) of the signals (for example, reference signals in a cellular system) emitted by transmitters. In some applications, imprecise estimates of the mobile device's position may have "life or death" consequences for the user. For example, an imprecise position estimate of a mobile device, such as a mobile phone operated by a user calling 911, can delay emergency personnel response times. In less dire situations, imprecise estimates of the mobile device's position can negatively impact navigation applications by directing a user to the wrong location or taking too long to provide accurate directions. Use of an accurate base station almanac for a given region can be used to further improve performance and accuracy for mobile device position estimation.

SUMMARY

In some aspects, the techniques described herein relate to a method, including: determining, by a compute node, a plurality of estimated positions for a plurality of cells within a region using cellular signals received by a receiver at a plurality of known receiver positions within the region; determining, by the compute node, a plurality of first cell groups using the plurality of cells; determining, by the compute node, respective estimated positions for each cell group of the plurality of first cell groups; validating, by the compute node, each cell group of the plurality of first cell groups using the respective estimated position of each cell group and the plurality of known receiver positions; generating, by the compute node, a plurality of second cell groups based on the cell group validation; using, by the compute node, an estimated position of each cell group of the plurality of second cell groups as an estimated position of a respective base station within the region; and updating, by the compute node, a base station almanac using a respective estimated position for each of the base stations.

DETAILED DESCRIPTION

Building base transceiver station (BTS) almanacs associated with various cellular service operators, in a transparent manner and without operator assistance, is sometimes necessary. For example, in some scenarios, an operator may not wish to share almanac data with a third-party, or the cost of accessing the almanac data may be prohibitively expensive for a third-party. In some embodiments, the location of cell towers and/or base stations and corresponding parameters are found by collecting data using an RF receiver ("receiver"), such as a universal software radio peripheral or other software-defined radio, at multiple locations within a region. In some scenarios, the RF scanner is moved from location to location within the region using a vehicle such as a car, plane, helicopter, or drone. The location of the receiver is assumed to be known with high-precision by using a survey-grade Global Navigation Satellite System (GNSS) and sometimes aided by an Inertial Navigation System (INS). After measuring cellular signals from multiple locations within the region, and given the assumed known locations of the receiver as the cellular signals were measured, multilateration is performed to generate estimated positions of the cell towers and/or base stations within the region.

As described herein, a cellular base station typically includes multiple sectors or cells to provide 360-degrees of coverage within a region. For example, a base station often includes at least three cells or sectors, each providing 120-degrees of coverage within a given region. Using conventional multilateration techniques, a receiver may ideally receive signals from a particular cell from multiple points within a region (assuming that the signals could be received at each point), and then use time of arrival estimates to determine an estimated position of that cell relative to a known position of the receiver. However, without the assistance from an associated network operator of the cell, the receiver may not be able to easily determine that two or more cells are co-located at the same base station and therefore can not easily determine position and timing information associated with a particular base station when populating a base station almanac.

Base station almanacs may be used in association with cellular networks that provide mobile device position estimation services. As such, a base station almanac may include supporting data such as base station identification information, precise base station antenna position information (e.g., 3D position and/or tilt), and timing information, such as base station clock bias and/or cellular signal timing correction information.

Figure 1:
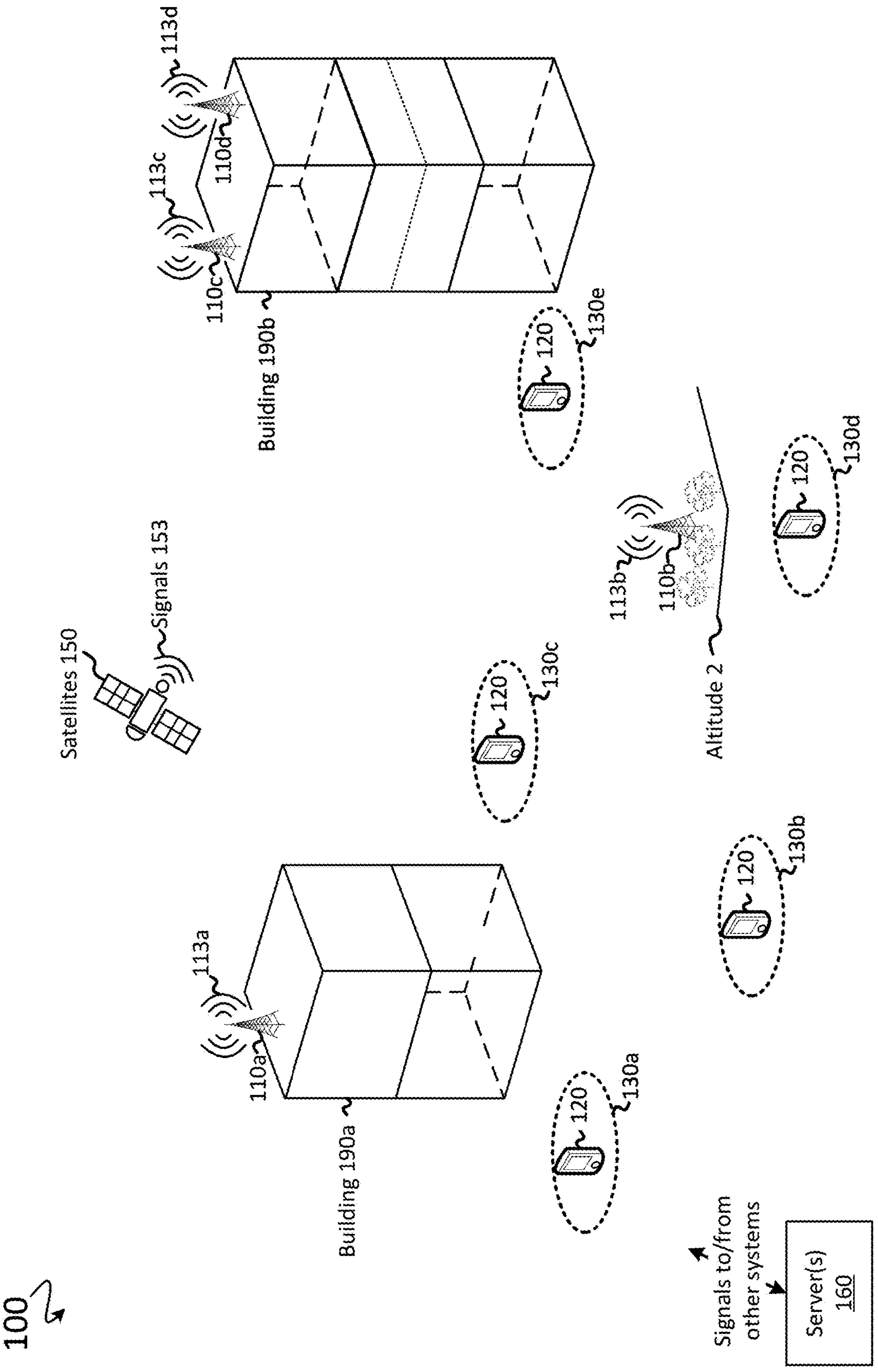
FIG. 1 shows an example of an operational environment within a region for cell tower and base station localization, in accordance with some embodiments.

Attention is initially drawn to an operational environment within a region for cell tower and base station localization as shown in FIG. 1, in accordance with some embodiments. The operational environment 100 contains a network of cell towers and/or base stations 110*a-d*, an example RF receiver 120 at multiple locations 130*a-e*, any number of buildings 190*a-b*, any number of satellites 150, and any number of servers 160. Also shown are cellular signals 113*a-d* associated with the respective cell towers/base stations 110*a-d*, and signals 153 associated with the satellites 150.

A cell tower is a physical structure that houses antennas and other equipment used to provide wireless coverage to a geographic area. It is usually owned by a tower company and leased to wireless carriers who place their equipment on the tower. By comparison, a base station includes the equipment used to transmit and receive wireless signals between a mobile device and the network. It includes radio equipment, such as transceivers and antennas, as well as baseband processing equipment that converts digital signals into analog signals and vice versa. For the purposes of position estimation and clock bias determination disclosed herein, cell towers and base stations will both be referred to herein as "base stations".

A "cell" in the context of this disclosure refers to a transmission cell as defined by the 3GPP standard. That is, a cell or sector in this context corresponds to a particular directional antenna of a cell tower or base station that provides signal coverage to a subregion (e.g., a 120-degree span) rather than referring to the larger geographical area (e.g., a 360-degree span) served by that base station. As such, each of the base stations 110*a-d* may include multiple directional antennas, one or more of which may correspond to a particular cell or sector of the region 100. Each cell/sector has a unique identifier and may be characterized by one central frequency. Cells and sectors may be identified by their Cell ID (CID) and/or physical Cell ID (PCI).

The base stations 110*a-d* and the receiver 120 may be located at different altitudes within the region 100. The signals 113*a-d* and 153 are exchanged between the receiver 120, the base stations 110*a-d*, and the satellites 150 using known wireless or wired transmission technologies. For example, the base stations 110*a-d* may transmit the signals 113*a-d* using one or more common multiplexing parameters—e.g., time slot, pseudorandom sequence, or frequency offset. The servers 160 and the receiver 120 may exchange information with each other.

The satellites 150 may be part of a GNSS which may include GPS or other satellite positioning systems such as Glonass, Galileo, and/or Compass/Beidou. The base stations 110*a-d* may include synchronized beacons of a wide area positioning system and may form a CDMA, TDMA, or OFDMA network. Each of the base stations 110*a-d* may be operable to transmit a cell reference signal (CRS) and/or a Pseudo Random Number (PRN) sequence with good cross-correlation properties such as a Gold Code sequence with a data stream of embedded assistance data. The receiver 120 is operable to receive ranging signals from the satellites 150 and/or the base stations 110*a-d* and to determine an estimated position thereof based on time of arrival estimates of the received signal. Additionally, the receiver 120 is operable to receive ranging signals from each of the respective base stations 110*a-d* at multiple locations within the region 100 and to determine an estimated position of each respective base station using the received ranging signals.

Figure 2:
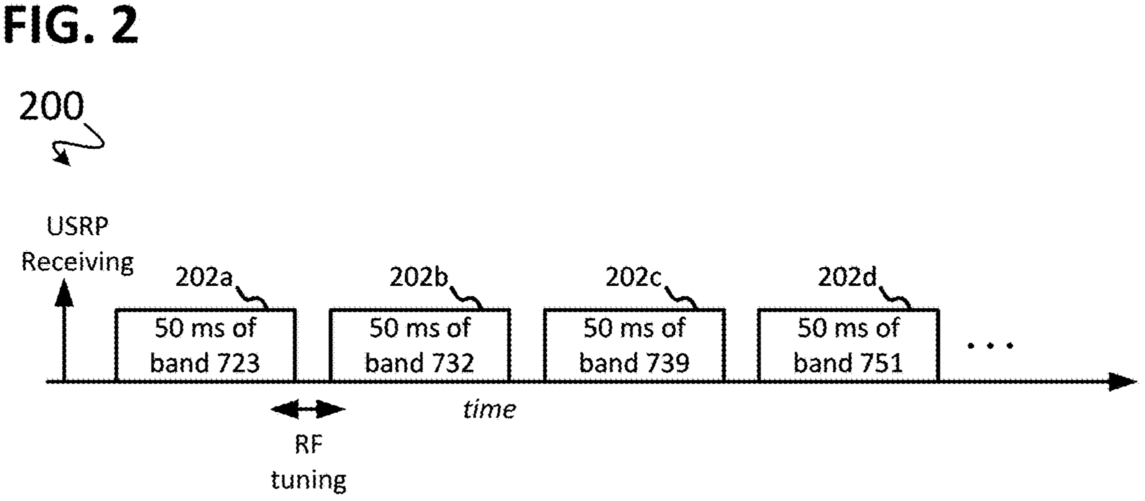
FIG. 2 shows a simplified graph of 50 ms "snapshots" of cellular signals received by a radio frequency receiver, in accordance with some embodiments.

As the receiver 120 moves through the region 100, e.g., at and between each of the positions 130*a-e*, multiband cellular signals, such as LTE and 5G signals, corresponding to multiple cellular carriers are measured and stored by the receiver 120. For example, FIG. 2 shows a simplified graph 200 of short signal time segments (e.g., 25 ms, 50 ms, 100 ms, etc.) "snapshots" of cellular signals received and stored by the receiver 120. As shown in FIG. 2, each of the snapshots 202*a-d* corresponds to a 50 ms short signal time segment of recorded cellular signal RF energy and may include multiple RF center frequencies from multiple cellular operators and is thereafter used to identify as many base stations as possible. Each of the cellular center frequencies, labeled 723, 732, 739, and 751, may be associated with one or more frequency bands of a particular cellular carrier and/or cellular operator. The RF snapshot process is repeated continuously or periodically as the receiver 120 moves through the region 100, thereby enabling the receiver 120 to determine estimated positions of the base stations 110*a-d* using multilateration. The receiver 120 additionally determines respective clock biases and cell identities of the base stations 113*a-d* to advantageously generate a base station almanac without receiving direct assistance from the cellular operators.

A clock used by the receiver 120 for determining base station parameters may be disciplined using GNSS or may be free-running. The latter scenario requires estimating the receiver clock biases, one per location. It can be solved by iteratively estimating cell and receiver clock biases given approximate cell positions and known receiver positions, then refining the cell positions given the estimated clock biases until convergence is reached.

The receiver 120 may additionally use a barometer and/or a terrain map to obtain an accurate altitude estimate. Determining the receiver's altitude using a barometer and/or terrain map advantageously assists receiver position estimation using GNSS and INS by reducing the number of unknowns (as the altitude can be known, in real-time or offline after the RF snapshot creation is complete).

3-D Terrain Map for Determining Base Station Height

In terrestrial localization systems, the RF receiver and the base stations are at roughly the same elevation (e.g., as compared to the vertical separation between a GNSS receiver and a GNSS satellite). This is also usually true for RF receivers that are transported by drones or helicopters. Hence, estimating the height of the base station's antenna is difficult. In some embodiments, if no additional information is available, an unknown height of a base station is replaced by the terrain altitude at an estimated location of the base station, plus an approximation of average building height in the area, plus a typical elevation of the antenna above the building. As a horizontal position estimate of the base station converges to a solution, the base station's altitude and antenna height based on the terrain's data at that location may be updated (i.e., adaptive altitude correction based on terrain map data).

Cell Grouping to Improve GDOP

Using multilateration to locate a given base station having multiple cells conventionally suffers from poor geometric dilution of precision (GDOP) due to sectorization in cellular systems such as LTE. This is because cellular signals associated with a given cell or sector of the base station can only typically be received in one direction. For example, if three sectors are used for a given base station to cover a 360-degree span, cellular signals from each sector can be received roughly within a span of 120-degrees out of the three sector's combined 360-degree coverage. As a result, an estimated position of the base station is not decorrelated from a clock bias thereof due to a lack of signal measurements made from opposite directions. The lack of signal measurements made from opposite directions leads to poor estimates of both the base station's position and clock bias. Additionally, when the cellular signals originate from the same direction, a change in receiver position will have the same impact on both the estimated position and estimated clock bias of a given base station. By comparison, when cellular signals originate from opposing directions, a change in receiver position will result in opposing changes to time of arrival (TOA) measurements made by the receiver. Consequently, separate position and clock bias solutions can only be obtained when the signals are received in opposing directions.

Figure 3A:
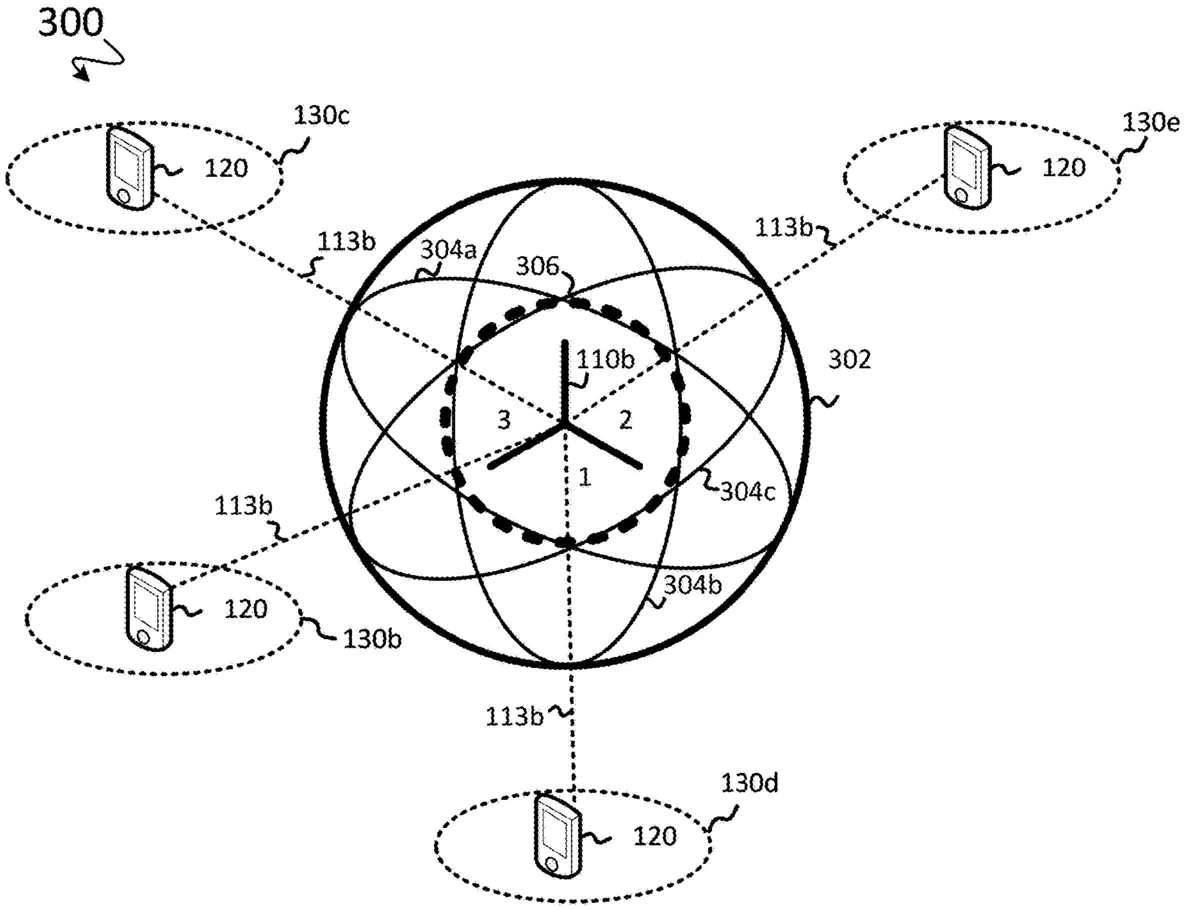
FIGS. 3A-B show simplified examples of cell tower or base station position and clock bias estimation, in accordance with some embodiments.
Figure 3B:
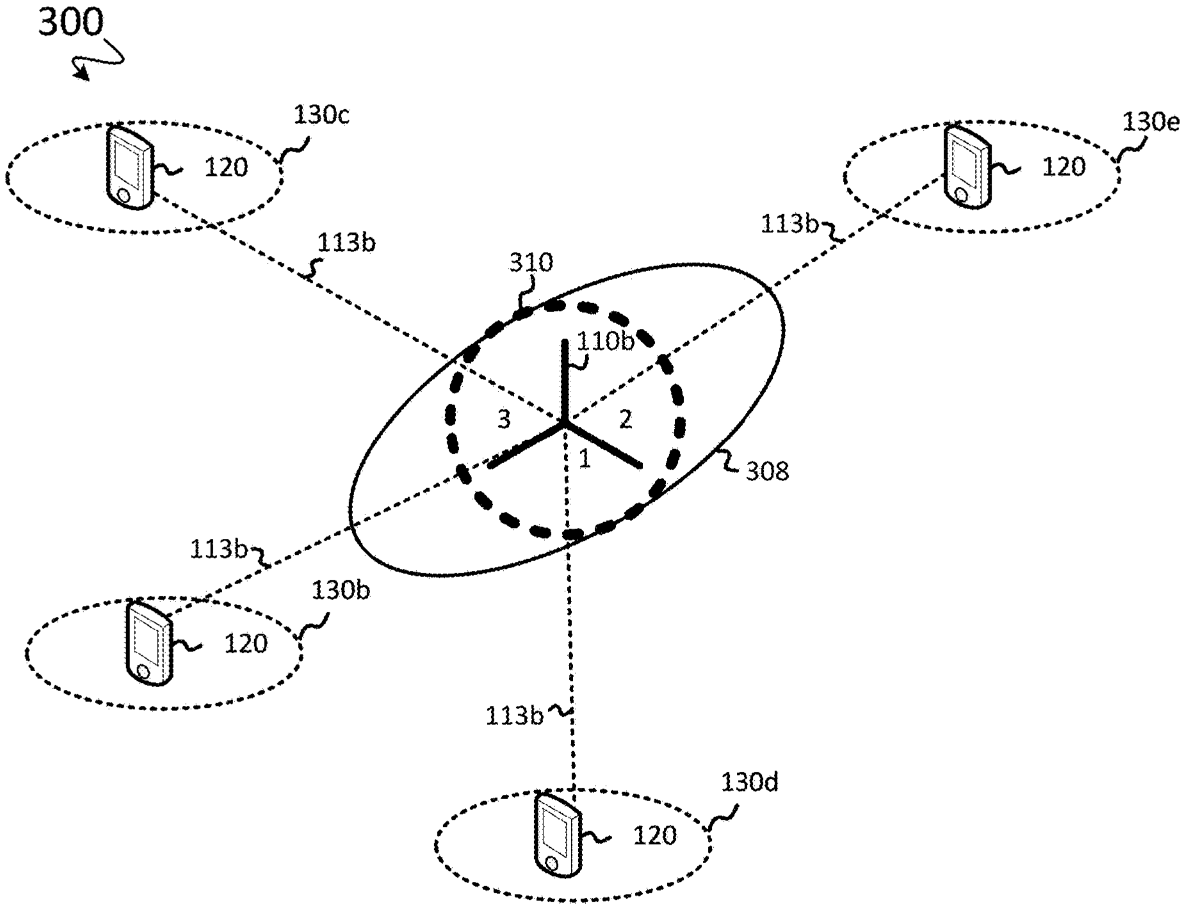

This concept is illustrated in FIGS. 3A-3B, which show a simplified representation 300 of the region 100 introduced in FIG. 1, in accordance with some embodiments. In FIGS. 3A-3B, the base station 110*b* introduced in FIG. 1 is shown to have three cells or sectors, labeled 1-3, each sector covering a 120-degree span of the base station 110*b*'s 360 degrees of coverage.

Also shown is the receiver 120 at locations 130*b-e*, a prior confidence 302 of an estimated position of the base station 110*b*, posterior confidences 304*a-c* of an estimated position of the base station 110*b* determined using the cellular signals 113*b* received at each of the locations 130*b-e*, and a combined posterior confidence 306 of an estimated position of the base station 110*b* when the cellular signals 113*b* received at each of the locations 130*b-e* are used for position estimation. The example of FIG. 3A shows position estimation of the base station 110*b* assuming that a clock bias of the base station is ignored.

To fully decorrelate the clock bias of the base station 110*b* and the position estimation thereof, cellular signals need to be received by the receiver from opposite directions relative to the base station 110*b*. For example, FIG. 3B shows an example posterior confidence 308 of an estimated position of the base station 110*b* derived using the cellular signals 113*b* received only at positions 130*b*, 130*c*, and 130*d* from cells or sectors 1 and 3. By comparison, an example posterior confidence 310 of an estimated position of the base station 110*b* was derived using cellular signals received at positions 130*c*, 130*d*, and 130*e*—i.e., from each of the three sectors.

As shown in FIG. 3B, in order to reduce the GDOP of an estimated position of the base station 110*b*, and to thereby decorrelate the clock bias of the base station 110*b* and the position estimation thereof, cellular signals within each of the sectors/cells in the same tower must be used by the receiver 120. However, without receiving assistance data from a cellular operator, the receiver 120 may not readily identify that each of the cells or sectors labeled 1, 2, and 3 in FIG. 3B are associated with the same base station.

Disclosed herein are processes for accurately and efficiently generating estimated positions of cellular base stations and other parameters thereof without receiving such assistance data from cellular operators to thereby independently construct a cell tower and base station almanac independently of cellular operators.

Because the receiver 120 may not identify that received cellular signals associated with various cells and sectors originated from the same cellular base station, the receiver 120 carries out an iterative cell/sector grouping process as disclosed herein to advantageously associate received cellular signals with respective cellular base stations. In practice, grouped cell locations may not necessarily be collocated, but can be relatively close together when they are placed at the corners of tall buildings to improve line of sight (LOS).

In some embodiments, cells and sectors can be grouped in one or more of three modes. A first mode is designated as "Intra-band", whereby cells from same the center frequency can be grouped to share the same clock bias and same position estimation. A second mode is designated as "Inter-band single-operator", whereby cells from different center frequencies of the same operator can be grouped to share the same position estimate, but use a different clock bias for each center frequency. A third mode is designated as "Inter-band multi-operator", which is similar to the first two modes above, but groups inter-operator cells when different cellular operators share the same cellular tower.

In some embodiments, cell and sector grouping techniques are based on so-called "clustering", as well as determining cell and sector ID patterns. Grouping using only distance-based clustering involves combining nearby (i.e., within a threshold distance from one another) cell position estimates (after multilateration in poor GDOP situations) into groups. Grouping using distance-based clustering usually works in residential or rural areas, but may fail in densely populated urban regions due to closer distances between cellular towers.

Determining cell and sector ID patterns, as its name suggests, involves using a determined or selected pattern to group cells. For example, some cellular operators use consecutive physical cell IDs (PCI) for each group of three cells that are in the same center frequency. Other operators use consecutive cell IDs (CID) which may be obtained by the receiver from SIB1 (System Information Block Type 1) data packets when the SIB1 packets are able to be decoded by the receiver. However, some cellular operators do not adhere to this convention, and even operators who do adhere to this convention do not do so systematically. Additionally, such grouping may require that the receiver approaches the base station closely from at least two sides if there are three sectors.

Figure 4:
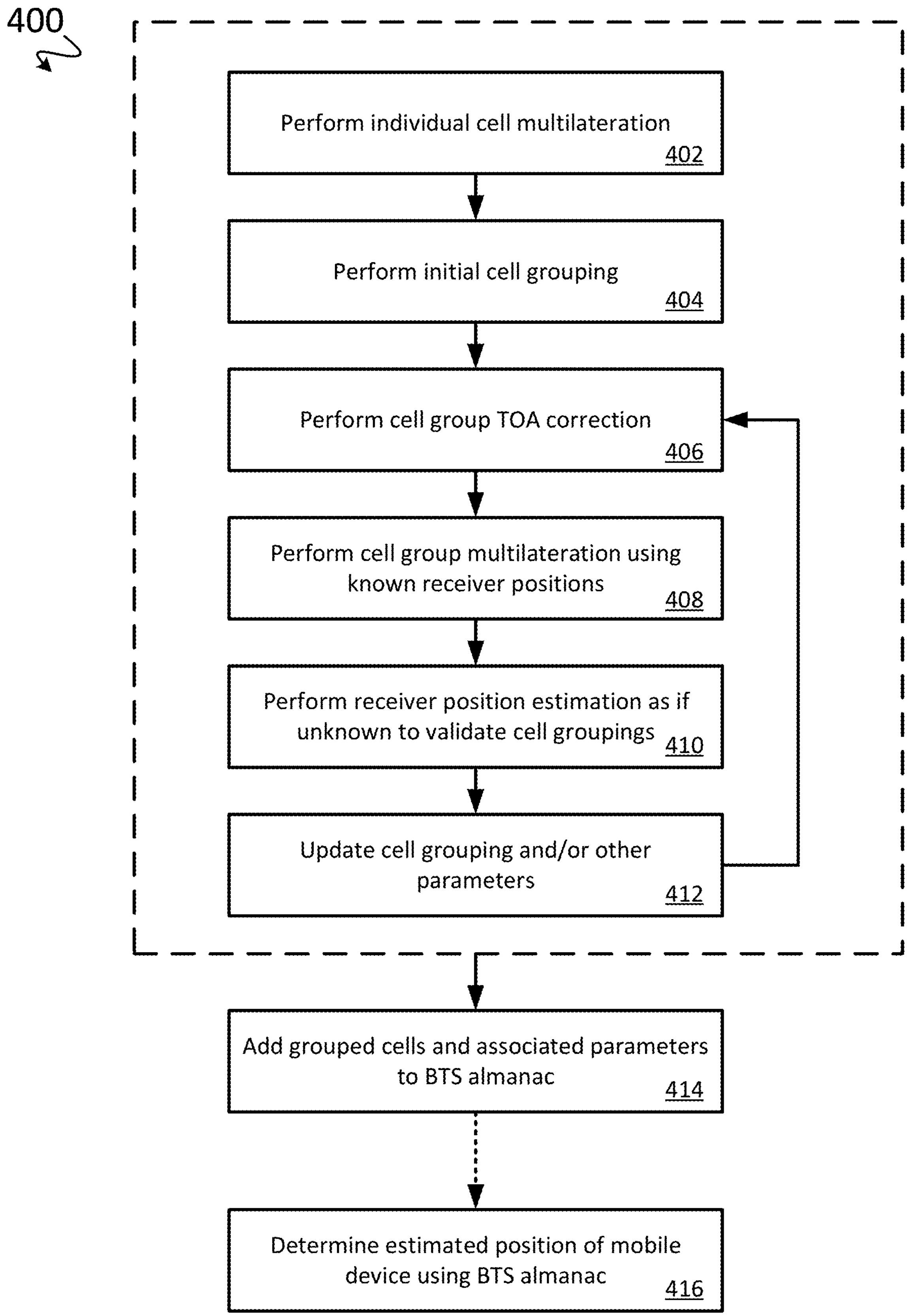
FIG. 4 shows an example high-level process for cell tower or base station position and clock bias estimation, in accordance with some embodiments.

A simplified overview of a process 400 for cell tower or base station position and clock bias estimation is shown in FIG. 4, in accordance with some embodiments. The particular steps, order of steps, and combination of steps are shown for illustrative and explanatory purposes only. Other embodiments can implement different particular steps, orders of steps, and combinations of steps to achieve similar functions or results. Each of the steps of the process 400 are described in greater detail herein. In some embodiments, the steps of the process 400 are performed by a compute node (e.g., one or more general purpose processors, FPGAs, ASICs, etc.) at the receiver 120 and/or by a compute node at the servers 160.

At step 402, cell multilateration is performed using snapshots of cellular signals that were received by the receiver 120 at multiple locations within a region to determine coarse position estimates and clock biases for each of the detected cells (or sectors). As described above, each of the cells may correspond to a directional antenna of a base station, each cell providing signal coverage to a sub-region of the base station's total coverage area. However, without operator assistance, it may not be known which groups of cells are associated with a particular base station.

At step 404, sets of individually identified cells are grouped together. Each cell group is initially assumed to include cells that are co-located at the same cellular tower, base station, or building (e.g., each cell could be associated with a different side of the building). Each of the grouped cells are assigned respective unknown x, y, z coordinates, and a clock bias b. At step 406, cell time of arrival (TOA) corrections and selections are performed for each of the cell groups. For example, in some embodiments, a cell group may be assigned the earliest TOA associated with one of the cell group's constituent cells. At step 408, cell group multilateration is performed using the assigned cell group TOAs and clock biases, based on the cell groupings performed at step 404, to improve the accuracy of the estimated position and clock bias for each cell group. Cell group multilateration is performed assuming a known position of the receiver 120 for each location at which data was collected. Performing multilateration based on grouped cells, as compared to individual cells and/or sectors, reduces the number of unknowns and greatly improves GDOP because cellular signals transmitted by each cell group can be received from multiple directions within a region as described above with reference to FIG. 3A and FIG. 3B.

At step 410, validation of the cell grouping is performed by determining, for multiple locations within the region, corresponding estimated positions of the receiver 120, as though the receiver's position was unknown, based on the position estimates and clock biases of the cell groups and using ranging signals therefrom. In some scenarios, validation of the cell grouping at step 410 updates the initial cell grouping that was performed at step 404 to create a new grouping. The estimated positions of the receiver 120 are compared to the high-quality position estimates which were determined for the receiver 120 using high-precision GNSS ranging signals and/or INS. Based on this comparison, it is determined whether the current cell grouping has improved the position estimate of the receiver as compared to a previously generated estimated position of the receiver determined with a different cell grouping hypotheses. Based on this position estimate comparison, cell grouping and/or other parameters, such as estimated cell clock biases, are updated at step 412. The process 400 may then iterate between steps 406 and 412 to update and modify cell groupings until a sufficient level of precision is achieved (as based on design parameters, network requirements, a service level agreement, etc.)

At step 414, the updated cell grouping and other parameters (such as base station positioning, clock biases, and cell identities of the base stations) are added to a new or existing base station almanac. In some embodiments, the base station almanac is stored at the one or more servers 160 and the information therein is associated with the base stations 110*a-d*. At step 416, multilateration is performed for a mobile device using the base station almanac and signals from associated base stations. For example, an estimated position of the mobile device 120 may be determined at the mobile device and/or at the servers 160 using the signals 113*a-d* received from respective base stations 110*a-d* using position and timing information associated with the base stations 110*a-d* located within the base station almanac stored at the servers 160 and/or the mobile device 120. Flow of the process 400 then returns to step 406 which was described above.

Improving GDOP Using an Assumed Distribution of Cell Clock Biases

Normally, cell clock biases relative to a time reference are not a free random variable, but instead follow a relatively tight distribution, possibly Gaussian, based on the cable length to the antenna, delays in the RF electronics, and other factors. Relative to UTC (which is the timing reference used at the receiver), an estimated mean and standard deviation of the cell clock bias may be determined for each center frequency. Once the clock biases are estimated, cell multilateration may be constrained to include an a priori likelihood of the clock bias. For the case of weighted least squares, such a constraint is equivalent to adding one more observation, involving a cell's clock bias only. The weight of this observation is a function of the uncertainty on the clock bias, and is helpful if the uncertainty is quite small compared to uncertainty related to signal multipath.

In some embodiments, each cell's clock bias is set to a constant value, such as the mean or median value mentioned above, with zero standard deviation during the initial multilateration step which occurs at step 402 of the process 400 before cell grouping is performed. However, if the clock bias of a given cell may be determined via another means (e.g., if it was previously determined and stored at a server that is accessible to the receiver), then the GDOP dramatically improves, even if signals are only received from a 120-degree span of a single cell. In such scenarios, cell grouping is less important to reduce GDOP. Knowledge, or an initial estimate, of the clock bias for a given cell may be used in first iterations of the process 400 disclosed herein to roughly determine the cell positions and help with cell grouping. In the subsequent iterations, cell grouping is performed and cell clock biases are estimated more precisely.

TOA Estimation

The time of arrival (TOA) estimation, sometimes referred to as a pseudorange, of a cellular signal received by the receiver 120 from a given cell is determined using conventional techniques which are well understood by one of ordinary skill in the art. TOA estimation is performed in a preliminary phase in each captured snapshot and center frequency, and for each cell (PCI) from which the receiver receives cellular signals, and for each receiver position as part of the multilateration steps of the process 400. At this phase, each antenna, cell, or sector is associated with at least one corresponding TOA estimate (i.e., there may optionally be more than one estimate in order to determine a "best candidate").

The cellular signals used to determine the TOAs are the broadcasted Cell-Specific Reference Signals (CRS) in the case of LTE. The receiver 120 correlates the received cellular signal with a local replica of the CRS and determines the TOA of the CRS. Standard Time Difference of Arrival (TDOA) or Time of Transmission (TOT) multilateration can then be used to generate an estimated position of a cell or cell group (or of the receiver when reverse multilateration is used for validation as described herein).

If the receiver 120 is moving during the capture of one of the capture periods including multiple center frequencies (i.e., the 50 ms snapshots described with reference to FIG. 2), the location of the receiver during each center frequency's capture period can be determined using GNSS and/or INS. This estimated position is used as the true position of the receiver when processing cells from this center frequency. Preferably, the true position of the receiver is related to the middle of the center frequency capture.

As described below, knowledge of the statistics related to TOA estimate noise (i.e., residuals) is useful in order to determine the most appropriate cost or loss function for multilateration. In some embodiments, it is feasible to iterate and return from the cell group multilateration phase at step 408 of the process 400 to the TOA correction and estimation phase at step 406 of the process 400 in order to fine-tune respective TOA estimates.

Iterative Optimization

In the base station localization problem, it is assumed that the true position of the receiver 120 for each location where cellular signals are captured is known and that the receiver is positioned at various locations surrounding one or multiple base stations. In some embodiments, the receiver clock bias is also known due to a high-quality clock (e.g., a Rubidium clock) being used by the receiver. However, in some embodiments, the receiver clock bias is treated as an unknown (e.g., to advantageously remove the constraint on what quality of receiver clock is used, thereby increasing the opportunities for crowdsourced data to be generated). It should be understood that the "true position" of the receiver is usually approximate due to various uncertainties (e.g., inaccurate GPS measurements). At each of the locations, the receiver 120 captures a snapshot of cellular signals from different center frequencies as described above. The receiver then estimates the TOA or pseudorange using the received cellular signals (based on CRS signals in the case of LTE). The pseudorange formula for a base station of index s and a receiver of index r (i.e., at position r), is expressed as:

$$\rho_{r,s} = d_{r,s} + b_r - b^s + n_{r,s} \quad \text{(Equation 1)}$$

$$d_{r,s} = \|x_r - x^s\| \quad \text{(Equation 2)}$$

where $d_{r,s}$ is the true distance between the base station and the receiver assuming knowledge of both the true receiver and base station positions. The distance between the receiver and the base station, given the true receiver position but unknown base station position, is denoted as $d_{r,s|r}$. The distance between the receiver position and the base station, assuming an unknown receiver position and using the most recent estimated position of the base station, is denoted as $d_{r,s|s}$. The parameter $b_r$ is the receiver clock bias (or clock bias) relative to a universal time or a network time. In some cases, $b_r$ can be known, e.g., via GPS. For each receiver position, the receiver clock bias $b_r$ has a respective value that is either previously known or is estimated. The parameter $b^s$ is the base station clock bias relative to the same universal time. For a synchronized network, the base station clock bias $b^s$ is assumed to be stable or nearly not varying. For an asynchronous network, the base station clock bias $b^s$ varies as a function of time. The value $\rho_{r,s}$ is the time of arrival measurement at the receiver in location r from a base station of index s, and $n_{r,s}$ is the measurement noise, quite often consisting of multipath and NLOS reception, with non-Gaussian statistics. Multipath may be especially prominent if the receiver 120 is not located at an elevated place such as in a drone, helicopter, or on top of a high rise. With reference to Equation 2, $x_r$, $x^s$ are the 3D vectors of coordinates of the receiver location and base station location, respectively.

To create estimated positions of each relevant base station, the process 400 iterates between estimating the base station location (at step 408) by performing multilateration for a cell group using the known receiver locations, and then estimating the receiver's locations as if unknown (at step 410) for validation and making cell grouping improvements. In each iteration, estimated network parameters, such as which cells are actually sectors of the same tower, are updated. Re-estimating the receiver's position and comparing it to the known, true position of the receiver enables validating the choices on the network structure (e.g., the estimated cell groupings, estimated cell positions, and estimated cell clock biases).

As described above, a significant problem in localizing the base stations of the network is a bad GDOP if position estimates for each cell are determined independently of other cells associated with a particular base station. This is because an individual cell of a base station often corresponds to one sector of a cell tower, and cellular signals therefrom are mainly received within a 120-degree span out of 360-degrees (i.e., only ⅓ of the horizontal plane). A low GDOP leads to poor position estimation for the cell—sometimes shifting an estimated position of the cell by hundreds of meters in the bad GDOP direction. As such, minor variations in noise can lead to quite different cell position estimates. For example, with reference to FIG. 3B, the base station 110*b* could be located anywhere within the stretched ellipse 308. Using a poorly estimated cell location to re-estimate the receiver's positions will accordingly lead to a bad estimate of the receiver's positions.

As is well understood in the art, a loss function is a mathematical function that calculates the difference between the predicted and actual value of a target variable. As disclosed herein, a loss function for base station position estimation is denoted by L(•) and may be any of an $L_2$ (mean squared error), $L_1$ (absolute error), Huber (less sensitive to outliers than $L_1$ or $L_2$ individually), or other loss functions known in the art.

The base station position estimation equation is expressed as:

$$\min_{x^s, b^s, b_r,} \sum_s \sum_r L(\rho_{r,s} - d_{r,s|r} - b_r + b^s). \quad \text{(Equation 3)}$$

By minimizing the loss function L(•), the estimated 3D vector of base station coordinates $x^s$, the estimated base station clock bias $b^s$, and the estimated receiver clock bias $b_r$, are updated at step 408 and the previously determined cell groupings and pseudoranges are updated based on the earliest times of arrival thereof. At step 410, validation is performed by re-estimating the receiver position as if it's unknown. That is, once a particular grouping changes, the looped sum over the base stations will change as well. For instance, if two separate cells (base stations) are considered, then the summation (index s) in Equation 2 and Equation 4 correspondingly includes these two cells. But after grouping these two cells, the summation (parameter s) only considers one index s which represents the two. The receiver localization formula used for validation is expressed as:

$$\min_{x^r} \sum_{r \in R_V} \sum_s L(\rho_{r,s} - d_{r,s|s} - b_r + b^s). \quad \text{(Equation 4)}$$

Equation 3 and Equation 4 are iterated over as cell groupings and other parameters are updated. For validation using multilateration of the receiver, only a subset of data in a validation region $R_v$ (described with reference to FIG. 6) is used, since receiver positions outside this region cannot be properly estimated.

Regarding the base station estimation equation shown in Equation 3, if the receiver clock bias $b_r$ is mathematically isolated and assumed to be constant, the double summation may be advantageously separated into smaller minimizations as shown below.

First, for each receiver position r, the receiver clock bias is estimated. That is, $$\text{For each } r\text{: } \min_{b_r} \sum_r L(\rho_{r,s} - d_{r,s|r} - b_r + b^s). \quad \text{(Equation 5)}$$

Additionally, for each base station s, the base stations location and clock bias are estimated, i.e., $$\text{For each } s\text{: } \min_{x^s, b^s} \sum_r L(\rho_{r,s} - d_{r,s|r} - b_r + b^s). \quad \text{(Equation 6)}$$

Equation 5 and Equation 6 are iterated over until convergence is reached, after which Equation 7, shown below, is performed. Equation 7 is derived using Equation 4, which may also be split into single summations to estimate the receiver's position and estimated clock bias for each position of the receiver as shown below:

$$\text{For each } r \in R_V\text{: } \min_{x^r} \sum_s L(\rho_{r,s} - d_{r,s|s} - b_r + b^s). \quad \text{(Equation 7)}$$

Separating the double summations of Equations 3 and 4 into the individual summations of Equations 5 through 7 advantageously reduces the complexity of the problem to be solved, but can also help with the convergence of iteratively reweighted least squares (IRLS) type of iterations. Similar to as described above, the three equations of Equations 5 through 7 are iterated over while updating the groupings and pseudoranges in each iteration.

In some embodiments, corrections are applied to the receiver's location vector $x_r$ in the validation formula shown in Equation 7. In some embodiments, the position validation formula shown in Equation 7 should be applied by including multiple RF captures in order to find a solution (e.g., spanning all operators and several frequency bands). As the receiver moves locations between RF captures, the vector $x_r$ should be updated.

In some embodiments, corrections to the receiver location vector $x_r$ in the validation formula of Equation 7 may be performed. In such embodiments, the position validation formula of Equation 7 is updated to include additional RF captures in order to find a solution (e.g., spanning all operators and several frequency bands or center frequencies). As the receiver moves between the RF captures, the vector $x_r$ is updated. A possible update formula is provided below.

Using the "relative true" trajectory of the receiver, starting from the position of capture of first band and ending at position of the capture of the last band, the unknown $x_r$ is updated according to this known relative trajectory. In some embodiments, the relative trajectory is based on the position of the first capture, for example. Hence, in Equation 7, $x_r$ may be replaced by $x_r+\Delta x_{r,s}$, where $\Delta x_{r,s}$ is a known displacement vector that is a function of the band index corresponding to the cell s. And therefore, $d_{r,s|s}=\|x_r+\Delta x_{r,s}-x^s\|$.

Cell Grouping

Figure 5A:
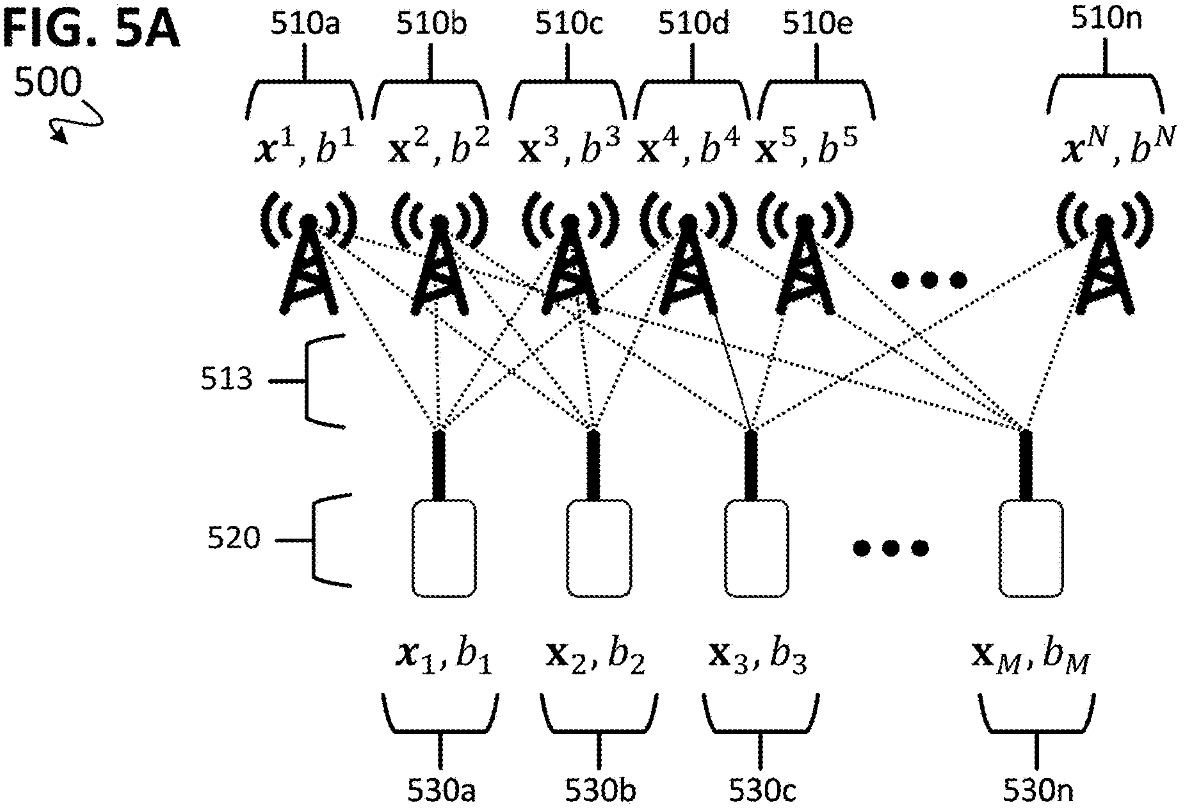
FIGS. 5A-B show simplified examples of cell or sector grouping, in accordance with some embodiments.

Attention is now drawn to FIG. 5A, which shows a simplified example 500 of cellular signal reception by a receiver at various positions, in accordance with some embodiments. In the example shown, various cellular signals 513 transmitted by the base stations 510*a-n* are received by a receiver 520 at various locations 530*a-n* and not received at others. For example, at locations 530*a-b*, the receiver 520 receives the cellular signals 513 from the base stations 510*a-d*, etc. However, the cellular signals 513 received by the receiver 520 at locations 530*a-b* from the base station 510*a* may correspond to different sectors or cells thereof. Thus, even though spatial diversity is attained by the receiver 520 as it moves between locations 530*a-b*, without performing cell grouping as disclosed herein, the receiver 520 may not be aware that the cellular signals received from the base station 510*a* at the two locations 530*a-b* are associated with the same base station. By grouping cells and/or sectors together and finding a unique location for the base station, the GDOP of the base station is greatly improved.

Figure 5B:
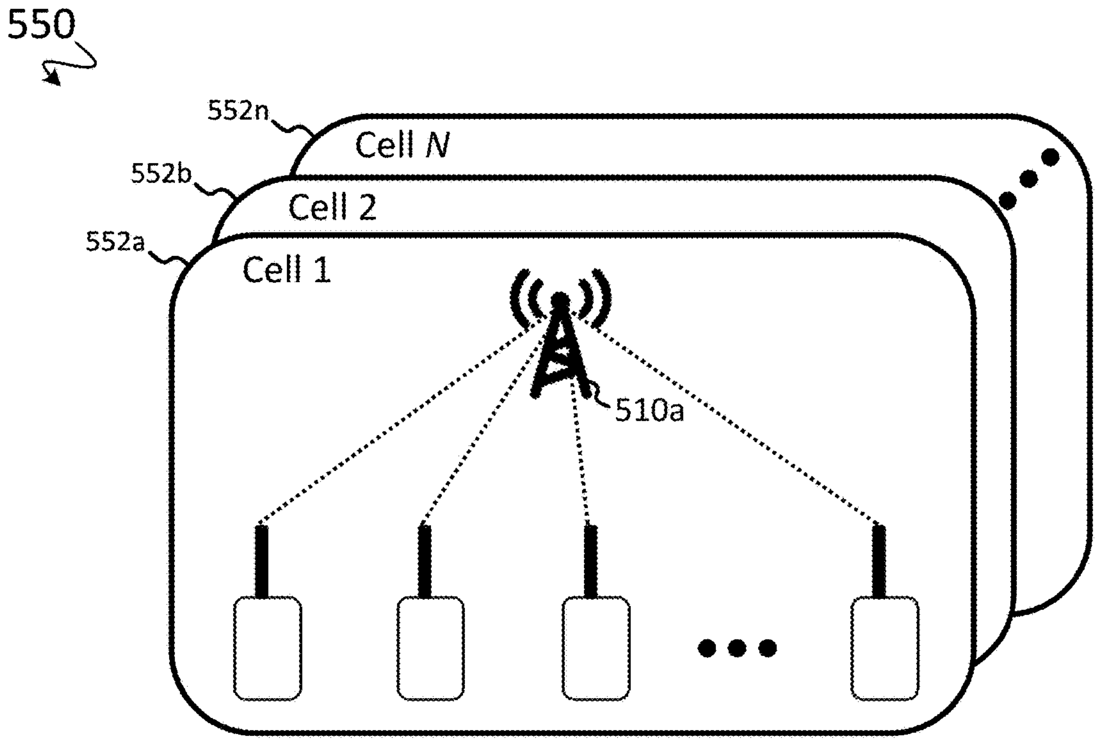

FIG. 5B shows a simplified example 500 of several cell separations 552*a-n* based on the cellular signals 513 received by the receiver 520 in FIG. 5A. In the example shown, the base station 510*a* has been associated with a cell 552*a*, labeled as "Cell 1".

Several techniques for grouping cells and sectors are disclosed herein. Such techniques may be based on PCI patterns, based on SIB1 global cell ID patterns, based on the proximity of a previous localization, and/or may be based on iteratively trying different groupings, in small steps, and determining which groupings minimize the residuals during the validation at step 410 of the process 400. In the context of multilateration, residuals refer to the differences between the measured distance or time-of-arrival (TOA) values and the expected or predicted values based on the geometry of the network.

When a cell grouping is slightly changed, residuals related to or affected by the grouping may be observed. If these residuals improve, then the cell grouping could be maintained. The next most likely cell grouping is then considered, and so on. It is possible that an inaccurate grouping decision was made at some point. Thus, it can be helpful to recheck each cell grouping multiple times, e.g., by breaking a particular cell grouping and observing the outcome.

Cell Group TOA

Initially, for a given receiver position, cellular signal TOAs are estimated from multiple antennas, antenna ports (as associated with LTE base stations), sectors, or cells. When nearly collocated cells are grouped together, the iterative multilateration process replaces all of a cell group's respective TOAs with a unique TOA corresponding roughly to the earliest time of arrival of the cells within that cell group. In some embodiments, this is performed as part of step 406 of the process 400.

More precisely, first a current estimate of the base station or group's clock bias, $b^s$, is subtracted from the various TOAs. Then, the late arrivals that do not overlap with the early arrivals are ignored. Then, among the early arrivals that usually overlap with each other, either the earliest time of arrival is used as a representative TOA for the cell group, or an average (e.g., a weighted average) of the overlapping arrival times is used as a representative time of arrival (i.e., an average of their estimated TOAs). In some embodiments, the weights of the weighted average are based on signal quality such a signal to noise ratio, or other metric.

If the cell grouping is modified during iterations by removing some cells or adding new cells to a given group, this operation is repeated. For example, some previously ignored late arrivals may no longer be ignored if the previous earliest arrivals are removed from the group.

If the iterative process can manage to estimate more than one clock bias, $b^s$, for a given cell group, when the clock bias $b^s$ per cell within the group changes, this operation is also repeated since the order of arrivals can change.

Furthermore, if the receiver is moving during the center frequency's capture, and if inter-band grouping is to be performed (intra-operator or inter-operator), then the position of the receiver varies between two different bands, i.e., it varies for two different cells belonging to the same group. In this case, the TOA of each cell within the group may also be compensated for an expected time of flight, given the current estimate of the cell position and true receiver position for the given band, before selecting the earliest arrival.

Validation

After cell grouping and re-multilateration to find the new group's positions, validation (at step 410 of the process 400) is an important step to ensure that the current cell grouping is helping, and not degrading accuracy. A given cell grouping may impact several estimated receiver positions. Thus, the receiver's positions are estimated for several locations, and the estimated positions are compared to the respective high-quality estimated positions of the receiver (e.g., determined using high-quality GNSS). Based on these position estimate comparisons, it is determined if the position estimates have improved based on the current cell grouping.

There are several ways to determine if the estimated receiver positions have improved, e.g., 1) if their median position error improved, 2) if their 90th percentile position error has been improved, 3) if the overall 90th percentile, including other groups and cells, of the position error has been improved, etc.

Figure 6:
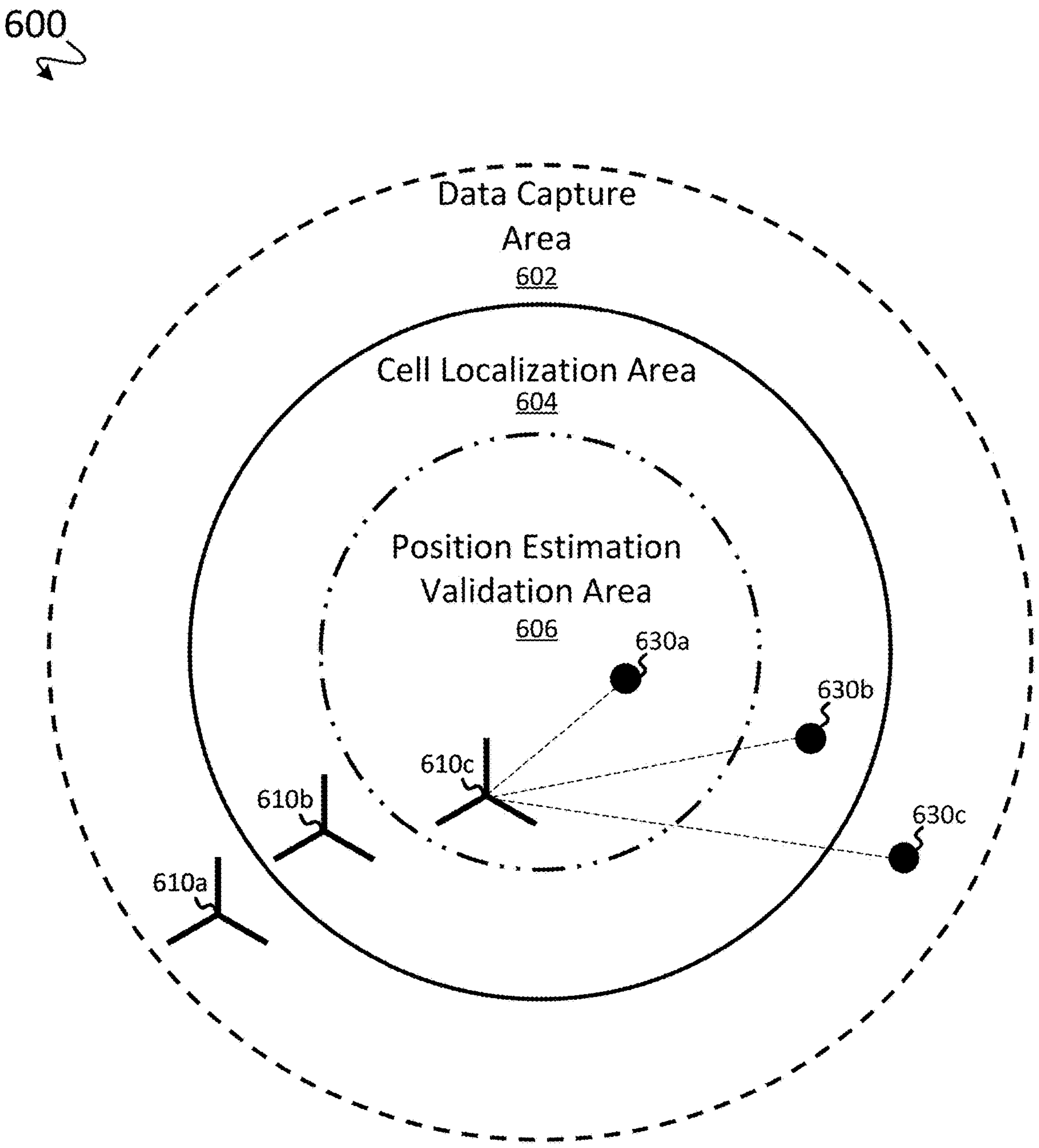
FIG. 6 shows a simplified example of position estimation validation regions, in accordance with some embodiments.

In some embodiments, ranging residuals of the receiver location outside of a position estimation validation area (as shown in FIG. 6) can also be used, thereby increasing the amount of data available for validation. In such embodiments, it is assumed that the most recent estimated position of a base station $d_{r,s|s}$ is equal to the true distance $d_{r,s}$ between the base station and the receiver, assuming knowledge of both the true receiver and base station positions, i.e., the true position of the receiver is used for validation, and the estimated residuals, $\hat{n}_{r,s}$ are considered for validation. It is also assumed that the subset $R_v$ of the validation region is expanded to include the full set of receiver locations.

Using the residuals has advantages over using position errors: 1) it allows using a larger received data set, 2) it uses the true receiver position and thus it may help in detecting certain issues, 3) it is not impacted by the multilateration loss function that could hide or ignore some measurements by considering some measurements to be outliers.

When using residuals for validation, one consideration is how to determine whether the residuals have improved for a given cell grouping. In general, after cell grouping is performed, some bad residuals (e.g., residuals associated with late time of arrivals) can be discarded, which can then reveal smaller residuals. On the other hand, before cell grouping, more parameters are used to perform cell position estimation, which could also reveal smaller residuals (but in an overfitted manner which might incorrectly reduce the residuals). Generally, if two cells or sectors are grouped, in one direction the residuals of a bad cell or sector (e.g., a cell or sector associated with bad residuals) will be masked and improved by the residuals of the good cell or sector, and vice versa in the other direction. As such, a condition for grouping cells or sectors properly is that each has to have some residuals "non-masked" after the grouping operation; otherwise, the operation is risky.

TOA Comparisons and Energy Detection for Grouping

In some embodiments, it may be determined that TOAs are quite similar from two cells as received by several receiver positions at sector intersections. If so, such cells may be grouped based on the TOA statistics. However, given strong noise from multipath reception, such decisions have to be carefully considered.

In some embodiments, the cell grouping decision is based on an energy detection method in several manners: if the number of the similar TOAs is more significant than the number of the different TOAs, for these two cells, the two cells may be considered as potentially belonging to the same group. This can be viewed as an energy detection problem, i.e., if the energy of the TOA differences (the integral of the square of the TOA differences) is small compared to an average energy of position estimation residuals (the integral of the square of the residuals), then the two cells may be grouped together. A variant is to look for at least M out of N TOA differences to reject the outliers.

To elaborate, an example of two nearby cells 1 and 2 having signals received by a receiver at a position r with TOA measurement $\rho_{r,1}$ and $\rho_{r,2}$, respectively, may be expressed as:

$$\rho_{r,1} = d_{r,1} + b^1 - b_r + n_{r,1} \quad \text{(Equation 8)}$$

$$\rho_{r,2} = d_{r,2} + b^2 - b_r + n_{r,2}. \quad \text{(Equation 9)}$$

If the two cells are located at the same base station, $d_{r,1} \approx d_{r,2}$ and $b^1 \approx b^2$, the TOA difference is $\Delta\rho_{r,21} = \rho_{r,2} - \rho_{r,1} \approx 0$. The detection problem is formulated as follows:

$$H0 \text{ (grouped): } \Delta\rho_{r,21} = \Delta n_{r,21}, \quad \text{(Equation 10)}$$

$$H1 \text{ (ungrouped): } \Delta\rho_{r,21} = \Delta d_{r,21} + \Delta n_{r,21}, \quad \text{(Equation 11)}$$

where $\Delta n_{r,21} = n_{r,2} - n_{r,1}$ and $\Delta d_{r,21} = d_{r,2} - d_{r,1}$, which is unknown depending on the receiver positions.

The hypothesis expressed in equation 10 (H0 (grouped)) assumes that the observed TOA differences are solely due to noise. By comparison, the hypothesis expressed in Equation 11 (H1 (ungrouped)) assumes that the observed TOA differences results are based on both noise and an actual difference in distances.

Because $\Delta d_{r,21} = 0$, though the two cells are associated with different base stations, when the receiver is in the mid-perpendiculars of those, at least 5 or more TOA differences are required for geometry variance and sufficient statistics.

The generalized likelihood ratio test (GLRT) decides H1 (ungrouped) if $$\frac{p(\Delta\rho_{r,21} \mid \Delta d_{r,21}, H1)}{p(\Delta\rho_{r,21}, H0)} > \gamma, \quad \text{(Equation 12)}$$

is the maximum likelihood (ML) estimator under H1, where $\Delta\rho_{r,21}$, $\Delta d_{r,21}$ are the TOA and the true distance differences at multiple receiver positions r, respectively, and $\gamma$ is the detection threshold to determine (described in further detail below). The functions p(•) represent respective probability density functions (PDFs) associated with the measurements under the two hypotheses H0 and H1.

For simplification, it may be assumed that the measurement noise $n_{r,1}$, $n_{r,2}$ is Gaussian and thus $\Delta n_{r,21}$ is also Gaussian with variance, $$\sigma^2_{\Delta n_{r,21}} = \sigma^2_{n_{r,1}} + \sigma^2_{n_{r,2}} - 2\sigma_{n_{r,1}}\sigma_{n_{r,2}} r_{r,21}, \quad \text{(Equation 13)}$$

where $r_{r,21}$ is a correlation coefficient between two TOA measurements which can be determined statistically given some known groups, or assumed to be uncorrelated and be used to apply some margin on the threshold $\gamma$. Thus, the ML for $p(\Delta\rho_{r,21} \mid \Delta d_{r,21}, H1)$ is $\Delta d_{r,21} = \Delta\rho_{r,21}$ and the above GLRT becomes:

$$T(\Delta\rho_{r,21}) = \frac{1}{\sigma^2_{\Delta n_{r,21}}} \sum_r \Delta\rho^2_{r,21} > \gamma. \quad \text{(Equation 14)}$$

If $T(\Delta\rho_{r,21})$ exceeds $\gamma$, the hypothesis H0 is rejected in favor of H1, indicating that the differences in TOA measurements are significant enough to suggest a true difference in distance rather than simply being attributed to noise.

In some embodiments, the TOA noise variance $$\sigma^2_{n_{r,s}} \left(\text{needed for } \sigma^2_{\Delta n_{r,21}}\right)$$

is computed based on the residuals after the first multilateration by $$\min_{\sigma^2_{n_{r,s}}} \sum_{r=1}^{N} L\left(v^T_{r,s|s}\sigma^{-2}_{n_{r,s}} v_{r,s|s}\right) - \frac{N}{2}\ln\left|\sigma^{-2}_{n_{r,s}}\right|, \quad \text{(Equation 15)}$$

where the residual is $$v_{r,s|s} = \rho_{r,s} - d_{r,s|s} - b_r + b^s, \quad \text{(Equation 16)}$$

N is the number of TOAs or receiver positions that see the cell s, and L (•) is a loss function, such as L2, L1, or Huber.

In some embodiments, the summation over the receiver positions r in $T(\Delta\rho_{r,21})$ is carefully selected by X-$\sigma$ outlier rejection with the variance of $\Delta\rho_{r,21}$ computed similar to $$\sigma^2_{n_{r,s}}$$

above, assuming that Gaussian noise $\Delta n_{r,21}$, $T(\Delta\rho_{r,21})$ is $\chi^2$ distributed. Thus, given a false negative rate $P_M$, a cell grouping decision threshold may be expressed as:

$$\gamma = Q^{-1}_{\chi^2_N}(P_M), \quad \text{(Equation 17),}$$

which is the inversed $\chi^2$ CDF with N degrees of freedom, i.e., the number of valid $\Delta\rho_{r,21}$ after the above X-$\sigma$ outlier rejection. In some embodiments, nearby cells are grouped together if $T(\Delta\rho_{r,21}) \leq \gamma$ and number of valid $\Delta\rho_{r,21}$ is at least 5 (or another appropriate number as determined by one of ordinary skill in the art) to maintain sufficient statistics.

However, performing grouping based on TOA comparisons may suffer from a reduced dataset that can be used for the comparison, as well as from possibly substantial multipath.

Data Collection Sets

FIG. 6 shows an example of a validation area 600 for cell grouping validation, in accordance with some embodiments. The validation area 600 includes a data capture area 602, a cell localization area 604, a position estimation validation area 606, base stations 610*a-c*, and receiver locations 630*a-c*. In some embodiments, different data collection sets are used for cell localization as compared to cell grouping validation. Using different data collection sets is generally considered to provide more accurate results. However, for best cell localization, it may be desirable to use all available data sets. Hence, an alternative is to use all available data sets for cell localization, and all available data sets for validation, within the allowed validation area (i.e., the position estimation validation area 606 shown in FIG. 6). However, even using all of the available data sets from within the position estimation validation area 606 is also a subset of all available data sets, as the data sets used are restricted to the position estimation validation area 606.

If ranging residuals are used for position estimation validation, then a subset of the data may be used which is spread more around the region and not restricted to the position estimation validation area. That is, with reference to FIG. 6, all of the data from the data capture area 602 may be considered. For example, in some embodiments, all of the data sets within the position estimation validation 606 may be used for position estimation and position estimation validation, but a subset of data sets that are outside of the position estimation validation area may be used as well.

For embodiments that use ranging residuals for validation, the entirety of data sets within the position estimation validation area 606 may be used, as well as data sets from a subset or all of the remaining areas 602 and 604.

In some embodiments, a more advanced process for cell grouping is used, as described below.

Loss Function Vs. Earliest Arrival

If the residuals' probability distribution (and its matching loss function) has zero probability for the negative residuals, e.g., multipath can only lead to positive residuals, and has a peak value at 0, then the loss function advantageously automatically acts as an earliest arrival selector. Indeed, the winning hypothesis will have at least one observation at zero, and with residual equal to 0, and hence the solution is also equal to the solution of the earliest arrival.

More generally, the loss function may proceed without selecting the earliest time of arrival. It will likely have a small negative residual part, in general. But also, as times of arrival are overlapping, it may be better not to choose the earliest time of arrival. Furthermore, if the earliest arrival time is not chosen, the complexity of selecting one observation out of a group of observations, when they are grouped, is removed. This is because all time of arrival observations will be used, but will be weighted according to their residuals, as well as other quality metrics.

Maximum Likelihood (ML) Vs Maximum Likelihood Region (MLR)

In some embodiments, rather than positioning the cell at one ML location, the cell may have a "fuzzy" location in which the ML (or corresponding loss function) has roughly similar strong values. This area tends to have an elliptic shape when the residuals follow a Gaussian distribution. More generally, this area can be determined via a grid search, whereby the loss function is evaluated to determine that it did not change substantially.

Figure 7A:
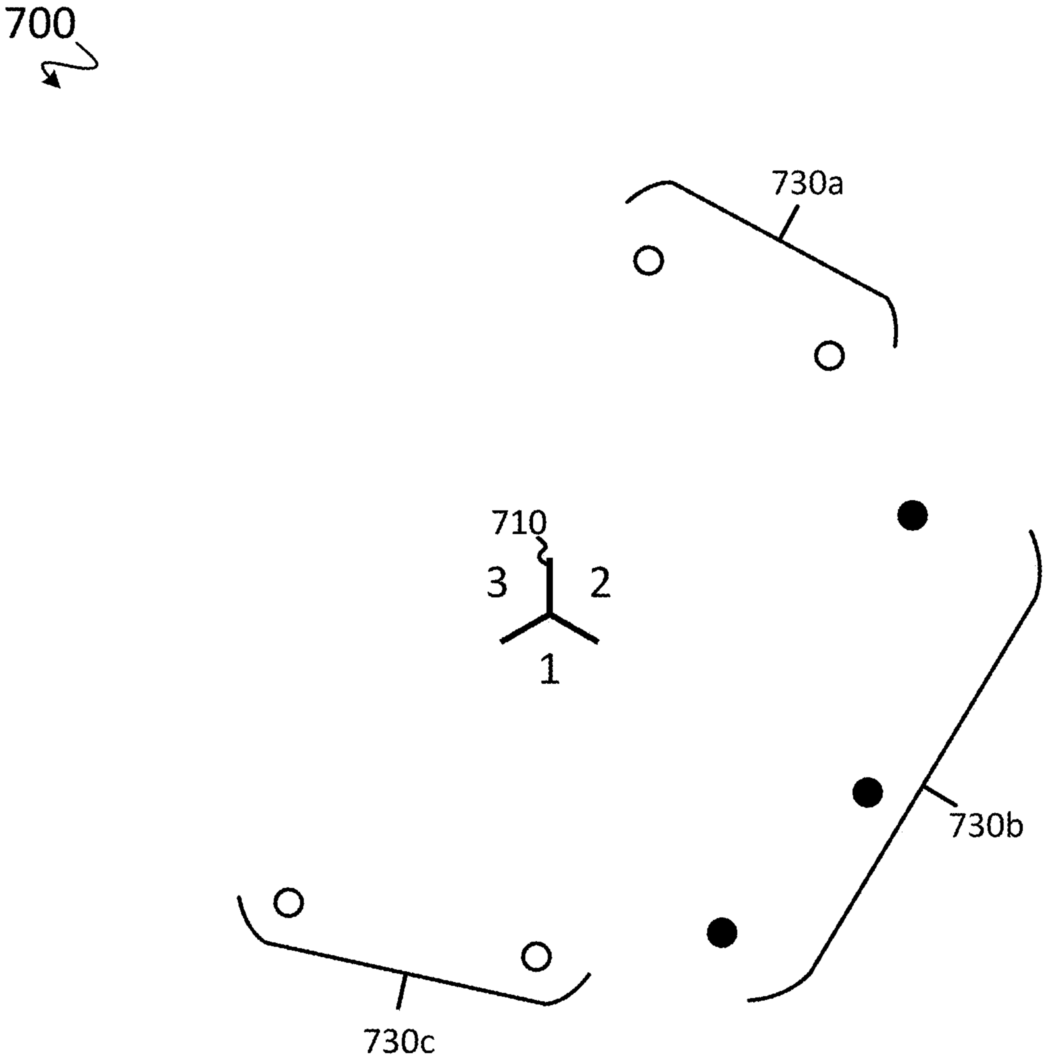
FIGS. 7A-B show simplified examples of using maximum likelihood regions for cell or sector grouping, in accordance with some embodiments.
Figure 7B:
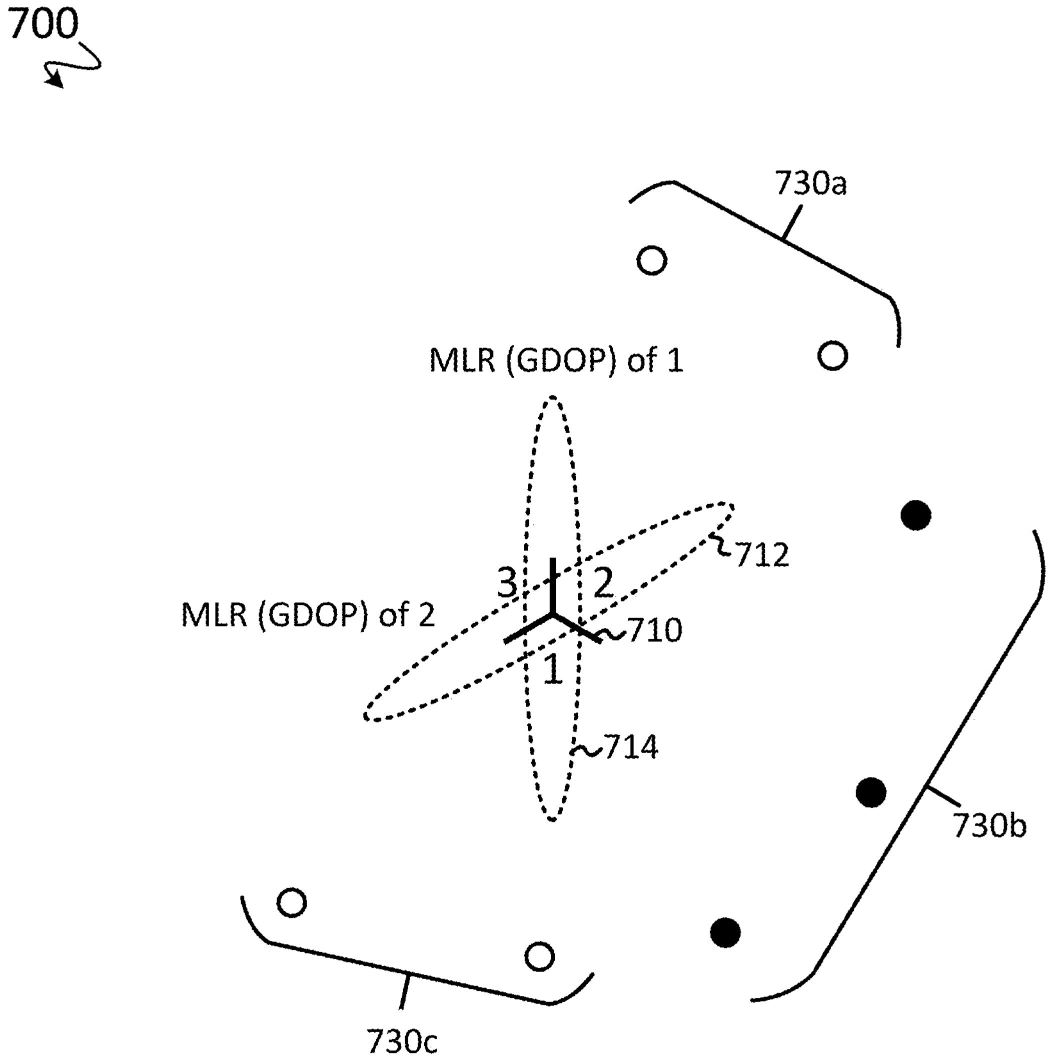

FIGS. 7A-B show an example region 700 having a base station 710 and receiver locations 730*a-c*, in accordance with some embodiments. FIG. 7B includes the elements of the region 700 previously described with reference 7A, but also illustrates elliptical ML regions 712 and 714, in accordance with some embodiments. In the example shown, the base station 710 could be located anywhere in either of the elliptical ML regions 712 and 714, and thus the ML within either of the elliptical ML regions 712 and 714 has a roughly similar score. However, the subsequent grouping will determine the position of the base station more accurately by reducing the elliptical regions 712 and 714 to a small circle of possibilities.

Cell Grouping Using ML Regions

Here, cell grouping has a bit of a different meaning as compared to previous sections. If the ML regions of two cells intersect (or are quite near), there is some chance the two cells belong to one group and are actually closer. Such sets of two or more cells are replaced by a cell group with unique coordinates and clock bias (that is likely to fall within the intersections of two or more ML regions). Each cell within the group is assigned a delta location and delta clock bias relative to the group. The delta is a function of the expected distances between the cells within a group: e.g., a Gaussian distribution with a mean at the center of the group (i.e., delta mean of 0), and with a standard deviation around 5 or 10 meters (it can be fine-tuned based on statistics of how the groups of sectors are organized, i.e., based on the deployed networks topology).

After cell grouping via ML regions is performed, cell position estimation and subsequent validation are performed by using all data sets received from all cells. The cell group determined using ML regions helps in accurately estimating the position of a group of cells. However, this method advantageously does not hide the observation of a given cell (via the earliest selection), even if it's an outlier. In fact, as the iterative process converges to a solution, a value may switch between the status of outlier and non-outlier at different stages of the convergence.

Cell group validation is performed as described above—either using receiver position errors, inside the validation area (a subset of the validation area), or using the ranging residuals. As described above, cell grouping decisions may also take into account SIB1 and PCI patterns. Probabilities of cell groupings may be assigned to such events, as an option. If cells are grouped, they should often be pointing in different directions and not aligned in the same direction. That is, the ML regions should not be parallel.

Initial Guess of Cell Locations

In some embodiments, the iterative process for cell position estimation needs an initial guess of the cell locations. A good starting point is to place a cell where it was heard by the receiver either earliest relative to UTC, or strongest in terms of reference signal received power (RSRP) (or a combination thereof). The earliest time of arrival relative to UTC observed over all receiver positions means that the receiver position that is nearest to the cell is selected as the starting position guess for the cell.

Clustering or Grouping Based on Cell ID

As described above, to improve the number of cells that are correctly grouped, a cell ID pattern obtained from LTE SIB1 may be used. It has been empirically determined that, quite often, cells on the same tower use consecutive numbers for cell ID (or for physical cell ID). This means that such consecutively numbered cells may be grouped. However, relying on a single method is not robust enough as sometimes this rule is not followed by all carriers. Clustering of cells creates a set of potentials candidate cells which may be grouped in order to reduce complexity of the cell grouping problem.

Figure 8:
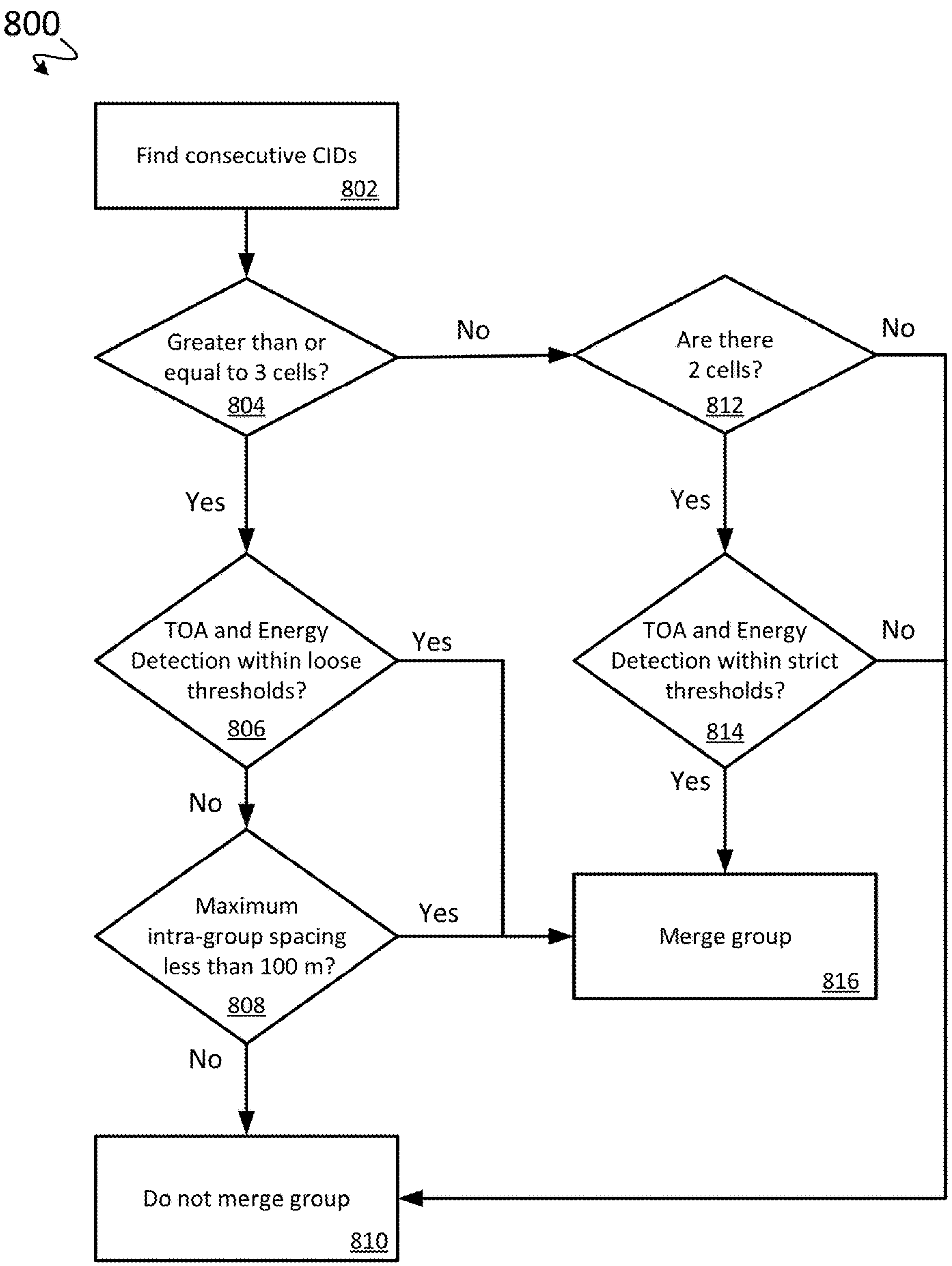
FIG. 8 shows an example high-level process for cell or sector grouping, in accordance with some embodiments.

A simplified overview of a process 800 for cell clustering based on Cell ID and Physical Cell ID patterns is shown in FIG. 8, in accordance with some embodiments. The particular steps, order of steps, and combination of steps are shown for illustrative and explanatory purposes only. Other embodiments can implement different particular steps, orders of steps, and combinations of steps to achieve similar functions or results. In some embodiments, the steps of the process 800 are performed by a compute node (e.g., one or more general purpose processors, FPGAs, ASICs, etc.) at the receiver 120 and/or by a compute node at the servers 160.

At step 802, consecutive Cell IDs within a group of cells are identified in the received signal dataset. At step 804, it is determined whether there are greater than or equal to three cells within the group of cells that have consecutive Cell IDs. If it is determined at step 804 that there are three or more cells with consecutive Cell IDs, the process 800 continues to step 806. At 806, it is determined if cellular signal parameters associated with the cells, such as the received TOAs and associated energy detection levels, meet the criteria of a first level of thresholds (so-called loose thresholds). In one example, the loose thresholds include determining that there are at least 5 or more (or another appropriate number as determined by one of ordinary skill in the art) valid TOA differences (e.g., within a threshold distance) within the group, and if the TOA noise variances are less than a first threshold noise level (e.g., 50 m). If both parameters are within their respective thresholds, flow of the process continues to step 816. At step 816, the cells of the group having consecutive Cell IDs are merged. If it was determined at step 806 that either of the parameters did not meet the criteria of the first level of thresholds (i.e., the loose thresholds), flow of the process continues to step 808. At step 808, it is determined if the maximum intra-group spacing of the cells having consecutive Cell IDs is less than 100 m. If it is determined at step 808 that the maximum intra-group spacing is not less than 100 m, flow continues to step 810 where it is determined not to merge the consecutively numbered cells of the group, and the process 800 either concludes or repeats for a next group of consecutively numbered cells.

If it was determined at step 804 that there are not three or more cells in the group that have consecutive cell IDs, flow continues to step 812. At step 812, it is determined if there are two cells in the group having consecutive cell IDs. If it is determined at step 812 that there are two cells in the group having consecutive cell IDs, flow continues to step 814. At 814, it is determined if the received TOAs and associated energy detection levels meet the criteria of a second level of thresholds (so-called strict thresholds). In one example, the second level of thresholds (i.e., strict thresholds) include determining that there are at least 10 or more valid TOA differences within the group and if TOA noise variances are less than a second noise threshold level (e.g., 30 m). If both parameters are within their respective thresholds, flow of the process continues to step 816 which was described above. If it was determined at step 812 that there are not two cells within the group with consecutive Cell IDs, or if it was determined at step 814 that either parameter did not meet the criteria of the strict thresholds, flow continues to step 810, which was described above.

Snap to Map

In some scenarios, the base station positions can be found using public databases (e.g., FCC in the US). In such scenarios, it is possible to "snap" (i.e., position) to the base station locations those cells that the above process appears to show quite near the tower.

Grouping of Receiver Positions

Similarly to cell or sector grouping, neighboring receiver positions can be grouped in order to select the a preferred position based on a predetermined criteria, e.g., the receiver position having the earliest time of arrival from a particular cell. In this case, it is beneficial to capture as many cellular signals as possible as the receiver is moving, and then for a group of receiver positions within a threshold distance of one another (e.g., within 30 m), the earliest time of arrival is selected and remaining times of arrival are eliminated. This will tend to favor good positions where the signal from the cell arrives with weak or no multipath, i.e., reduced noise. However, this logic may also be extended to receiver positions that are 200 m away or more in a similar manner as described above for the loss function for multilateration. In other words, instead of eliminating the late arrivals and masking them with the early arrivals, an appropriate loss function may inherently select the earliest time of arrival for a group of receiver positions, without the need to group. As such, late arrivals in the multilateration formula will automatically be given lower importance by the loss function, whether they are 10 m or 200 m away from another measurement; and this depends on the geometry, the distances, the timings, and the effective residuals.

Figure 9:
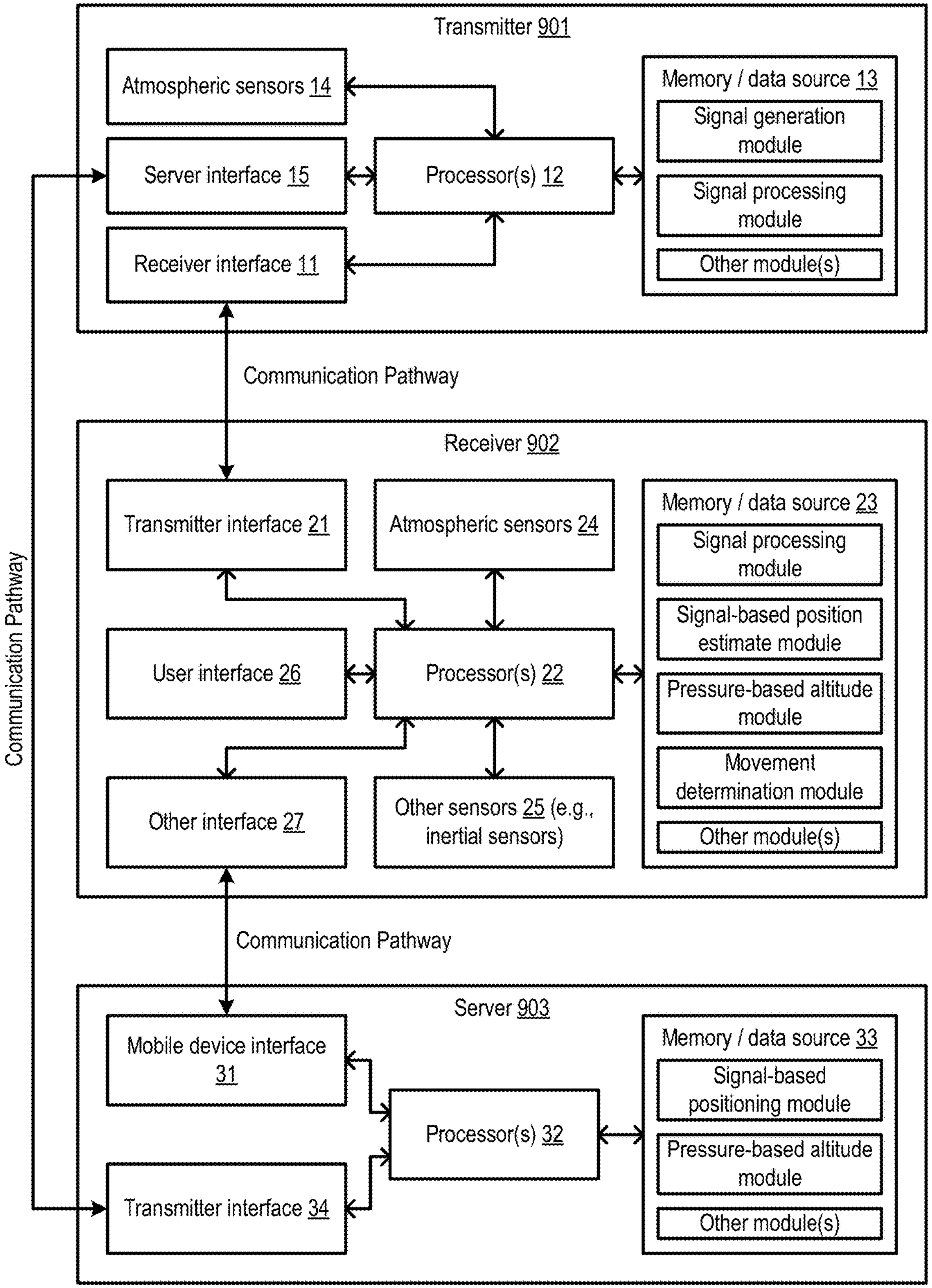
FIG. 9 illustrates the components of a transmitter, a receiver, and a server, in accordance with some embodiments.

FIG. 9 illustrates components of an example transmitter 901 (e.g., one of the base stations 110*a-d*), an example RF receiver 902 (e.g., the receiver 120), and an example server 903 (e.g., any one of the servers 160). Examples of communication pathways are shown by arrows between components. The components shown in FIG. 9 are operable to perform all or a portion of the process 400 and the process 800.

By way of example in FIG. 9, each of the transmitters 901 may include: a receiver interface 11 for exchanging information with a receiver (e.g., antenna(s) and RF front-end components known in the art or otherwise disclosed herein); one or more processor(s) 12; memory/data source 13 for providing storage and retrieval of information and/or program instructions; atmospheric sensor(s) 14 for measuring environmental conditions (e.g., pressure, temperature, humidity, other) at or near the transmitter; a server interface 15 for exchanging information with a server (e.g., an antenna, a network interface, or other); and any other components known to one of ordinary skill in the art. The memory/data source 13 may include a memory storing software modules with executable instructions, and the processor(s) 12 may perform different actions by executing the instructions from the modules, including (i) performance of a part or all of the methods as described herein or otherwise understood by one of skill in the art as being performable at the transmitter; (ii) generation of positioning signals for transmission using a selected time, frequency, code, and/or phase; (iii) processing of signals received from the mobile device or another source; or (iv) other processing as required by operations described in this disclosure. Signals generated and transmitted by a transmitter may carry different information that, once determined by a mobile device or a server, may identify the following: the transmitter; the transmitter's position; environmental conditions at or near the transmitter; and/or other information known in the art. The atmospheric sensor(s) 14 may be integral with the transmitter, or separate from the transmitter and either co-located with the transmitter or located in the vicinity of the transmitter (e.g., within a threshold amount of distance).

By way of example in FIG. 9, the receiver 902 may include: a transmitter interface 21 for exchanging information with a transmitter (e.g., an antenna and RF front-end components known in the art or otherwise disclosed herein); one or more processor(s) 22; memory/data source 23 for providing storage and retrieval of information and/or program instructions; atmospheric sensor(s) 24 (such as barometers, temperature sensors, other) for measuring environmental conditions (e.g., pressure, temperature, other) at the mobile device; other sensor(s) 25 for measuring other conditions (e.g., inertial sensors for measuring movement and orientation); a user interface 26 (e.g., display, keyboard, microphone, speaker, other) for permitting a user to provide inputs and receive outputs; another interface 27 for exchanging information with the server or other devices external to the mobile device (e.g., an antenna, a network interface, or other); and any other components known to one of ordinary skill in the art. A GNSS interface and processing unit (not shown) are contemplated, which may be integrated with other components (e.g., the interface 21 and the processors 22) or a standalone antenna, RF front end, and processors dedicated to receiving and processing GNSS signaling. The memory/data source 23 may include a memory (e.g., a data storage module) storing software modules with executable instructions, and the processor(s) 22 may perform different actions by executing the instructions from the modules, including (i) performance of a part or all of the methods as described herein or otherwise understood by one of ordinary skill in the art as being performable at the mobile device; (ii) estimation of an altitude of the mobile device based on measurements of pressure from the mobile device and transmitter(s), temperature measurement(s) from the transmitter(s) or another source, and any other information needed for the computation); (iii) processing of received signals to determine position information (e.g., times of arrival or travel time of the signals, pseudoranges between the mobile device and transmitters, transmitter atmospheric conditions, transmitter and/or locations or other transmitter information); (iv) use of position information to compute an estimated position of the mobile device; (v) determination of movement based on measurements from inertial sensors of the mobile device; (vi) GNSS signal processing; or (vii) other processing as required by operations described in this disclosure.

By way of example in FIG. 9, the server 903 may include: a mobile device interface 31 for exchanging information with a mobile device (e.g., an antenna, a network interface, or other); one or more processor(s) 32; memory/data source 33 for providing storage and retrieval of information and/or program instructions; a transmitter interface 34 for exchanging information with a transmitter (e.g., an antenna, a network interface, or other); and any other components known to one of ordinary skill in the art. The memory/data source 33 may include a memory storing software modules with executable instructions, and the processor(s) 32 may perform different actions by executing instructions from the modules, including (i) performance of a part or all of the methods as described herein or otherwise understood by one of ordinary skill in the art as being performable at the server; (ii) estimation of an altitude of the mobile device; (iii) computation of an estimated position of the mobile device; or (iv) other processing as required by operations described in this disclosure. Steps performed by servers as described herein may also be performed on other machines that are remote from a mobile device, including computers of enterprises or any other suitable machine.

Certain aspects disclosed herein relate to estimating the positions of mobile devices—e.g., where the position is represented in terms of latitude, longitude, and/or altitude coordinates; x, y, and/or z coordinates; angular coordinates; or other representations. Various techniques to estimate the position of a mobile device can be used, including trilateration, which is the process of using geometry to estimate the position of a mobile device using distances traveled by different "positioning" (or "ranging") signals that are received by the mobile device from different beacons (e.g., terrestrial transmitters and/or satellites). If position information like the transmission time and reception time of a positioning signal from a beacon is known, then the difference between those times multiplied by the speed of light would provide an estimate of the distance traveled by that positioning signal from that beacon to the mobile device. Different estimated distances corresponding to different positioning signals from different beacons can be used along with position information like the locations of those beacons to estimate the position of the mobile device. Positioning systems and methods that estimate a position of a mobile device (in terms of latitude, longitude, and/or altitude) based on positioning signals from beacons (e.g., transmitters, and/or satellites) and/or atmospheric measurements are described in co-assigned U.S. Pat. No. 8,130,141, issued Mar. 6, 2012, and U.S. Pat. No. 9,057,606, issued Jun. 16, 2015, incorporated by reference herein in its entirety for all purposes. It is noted that the term "positioning system" may refer to satellite systems (e.g., Global Navigation Satellite Systems (GNSS) like GPS, GLONASS, Galileo, and Compass/Beidou), terrestrial transmitter systems, and hybrid satellite/terrestrial systems.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A method, comprising:

determining, by a compute node, a plurality of estimated positions for a plurality of cells within a region using cellular signals received by a receiver at a plurality of known receiver positions within the region;

determining, by the compute node, a plurality of first cell groups using the plurality of cells;

determining, by the compute node, respective estimated positions for each cell group of the plurality of first cell groups;

validating, by the compute node, each cell group of the plurality of first cell groups using the respective estimated position of each cell group and the plurality of known receiver positions;

generating, by the compute node, a plurality of second cell groups based on the cell group validation;

using, by the compute node, an estimated position of each cell group of the plurality of second cell groups as an estimated position of a respective base station within the region; and updating, by the compute node, a base station almanac using a respective estimated position for each of the base stations.

2. The method of claim 1, wherein determining the plurality of estimated positions for the plurality of cells within the region comprises:

receiving, by the receiver at the plurality of known receiver positions, a plurality of short time segments of cellular signals from the cells, the cellular signals having multiple center frequencies;

determining, by the compute node, a plurality of time of arrival estimates for each received short time segment of cellular signals; and associating each cell with at least one corresponding time of arrival estimate.

3. The method of claim 1, wherein determining the plurality of estimated positions for the plurality of cells within the region comprises:

determining, by the compute node, an initial estimated altitude of a base station associated with one or more of the cells using a terrain altitude at an estimated location of the base station.

4. The method of claim 1, wherein, the plurality of known receiver positions within the region are determined using ranging signals received at the receiver from a satellite-based navigation system.

5. The method of claim 1, wherein, each cell corresponds to one or more directional antennas of a respective base station.

6. The method of claim 1, wherein determining the plurality of first cell groups comprises:

grouping cells of the plurality of cells based on determined cell and sector ID patterns.

7. The method of claim 1, wherein determining the plurality of first cell groups comprises:

grouping cells of the plurality of cells into groups based on a determined distance between the cells.

8. The method of claim 1, wherein determining the plurality of first cell groups comprises:

grouping cells of the plurality of cells of a same network operator and having the same center frequency to share a same estimated position and clock bias.

9. The method of claim 1, wherein determining the plurality of first cell groups comprises:

grouping cells of the plurality of cells having a same network operator and different center frequencies to share a same estimated position and a different clock bias.

10. The method of claim 1, wherein determining the plurality of first cell groups comprises:

determining a first set of cellular signal time of arrivals (TOAs) and position estimation residuals for a first cell of the plurality of cells using the receiver at the plurality of known receiver positions;

determining a second set of cellular signal TOAs and position estimation residuals for a second cell of the plurality of cells using the receiver at the plurality of known receiver positions;

generating a comparison of an integral of the square of cellular signal TOA differences between the first set and second set to an integral of the square of residuals of the first set and the second set; and grouping the first cell and the second cell based on the generated comparison.

11. The method of claim 1, wherein determining the plurality of first cell groups comprises:

determining a first set of cellular signal time of arrivals (TOAs) for a first cell of the plurality of cells using the receiver at the plurality of known receiver positions;

determining a second set of cellular signal TOAs for a second cell of the plurality of cells using the receiver at the plurality of known receiver positions;

determining a first probability density function for cellular signal TOA differences between the first set of cellular signal TOAs and the second set of cellular signals TOAs expressing a condition in which the first cell and the second cell are located at a same base station and that observed cellular signal TOA differences are caused by noise;

determining a second probability density function for cellular signal TOA differences between the first set of cellular signal TOAs and the second set of cellular signal TOAs expressing a condition in which the first cell and the second cell are located at different base stations and that the observed cellular signal TOA differences are caused both by position differences and noise;

determining a ratio between the second probability density function and the first probability density function; and upon determining that the ratio exceeds a detection threshold value, grouping the first cell and the second cell together.

12. The method of claim 1, wherein determining the plurality of first cell groups comprises:

determining a first set of cellular signal time of arrivals (TOAs) for a first cell of the plurality of cells using the receiver at the plurality of known receiver positions;

determining a second set of cellular signal TOAs for a second cell of the plurality of cells using the receiver at the plurality of known receiver positions;

determining an estimation of measurement noise associated with the first set of cellular signal TOAs and the second set of cellular signal TOAs;

generating a sum of the square of cellular signal TOA differences between the first set of cellular signal TOA differences and the second set of cellular signal TOA differences;

determining a ratio between the sum of the square of cellular signal TOA differences and the estimation of measurement noise; and upon determining that the ratio exceeds a detection threshold value, grouping the first cell and the second cell together.

13. The method of claim 1, wherein determining the plurality of first cell groups comprises:

identifying a first set of cells of the plurality of cells having consecutive cell IDs;

upon determining that the first set of cells includes greater than or equal to three cells:

determining if signal parameters associated with cellular signals from the first set of cells satisfy a first level of thresholds; and upon determining that the signal parameters satisfy the first level of thresholds, grouping the first set of cells; and upon determining that the first set of cells includes fewer than three cells:

determining if the signal parameters associated with the first set of cells satisfy a second level of thresholds; and upon determining that the signal parameters satisfy the second level of thresholds, grouping the first set of cells.

14. The method of claim 13, wherein:
the signal parameters comprise cellular signal time of arrivals (TOAs) determined using the receiver at the plurality of known receiver positions; and
the first level of thresholds are based on determining if differences between the cellular signal TOAs are within a threshold distance, and determining if noise variances of the cellular signal TOAs are within a threshold noise level.

15. The method of claim 13, wherein:
the signal parameters comprise cellular signal time of arrivals (TOAs) determined using the receiver at the plurality of known receiver positions;
the first level of thresholds are based on determining if a first number of the cellular signal TOAs are within a threshold distance of one another and determining if noise variances of the cellular signal TOAs are within a first threshold noise level;
the second level of thresholds are based on determining if a second number of the cellular signal TOAs are within the threshold distance of one another and determining if the noise variances of the cellular signal TOAs are within a second threshold noise level;
the second number of cellular signal TOAs is greater than the first number of cellular signal TOAs; and
the second threshold noise level is greater than the first threshold noise level.

16. The method of claim 1, wherein validating each cell group of the plurality of first cell groups comprises:
minimizing a first loss function for each cell group and known receiver position to determine a respective estimated cell group position based on each known receiver position;
minimizing a second loss function for each estimated cell group position and known receiver position to determine an estimated receiver position as if the receiver position is unknown; and
validating each cell group based on a comparison of each estimated receiver position to each known receiver position.

17. The method of claim 1, wherein validating each cell group of the plurality of first cell groups comprises:
minimizing a first loss function for each known receiver position to determine a respective estimated receiver clock bias value based on each known receiver position;
minimizing a second loss function for each cell group to determine a respective estimated cell group position and estimated cell group clock bias based on each known receiver position;
minimizing a third loss function for each estimated cell group position and known receiver position to determine an estimated receiver position as if the receiver position were unknown; and
validating each cell group based on a comparison using each estimated receiver position as compared to each known receiver position.

18. The method of claim 1, wherein validating each cell group of the plurality of first cell groups comprises:
minimizing a first loss function for each cell group to determine a respective estimated cell group position and estimated cell group clock bias based on each known receiver position and a known receiver clock bias;
minimizing a second loss function for each estimated cell group position and known receiver position to determine an estimated receiver position as if the receiver position were unknown; and
validating each cell group based on a comparison using each estimated receiver position as compared to each known receiver position.

19. The method of claim 1, wherein validating each cell group of the plurality of first cell groups comprises:
for each cell group:
using an estimated position of that cell group and cellular signals therefrom to estimate a clock bias of the receiver within the region as if the position of the receiver is known and the position of the cell group is unknown;
using an estimated position of that cell group and cellular signals therefrom to estimate a clock bias of the receiver within the region as if the position of the receiver is unknown; and
validating each cell group based on a comparison using the estimated receiver positions and the known receiver positions.

20. The method of claim 1, further comprising:
generating, by the compute node, respective estimated timing biases for each cell group of the plurality of first cell groups;
validating, by the compute node, each cell group of the plurality of first cell groups further using the respective estimated timing biases for each cell group;
using, by the compute node, the respective estimated timing bias of each cell group as an estimated timing bias of a respective base station within the region; and
updating, by the compute node, the base station almanac using the respective estimated timing bias for each of the base stations.

* * * * *